United States Patent
Wang

(10) Patent No.: US 12,248,980 B2
(45) Date of Patent: Mar. 11, 2025

(54) METHOD, COMPUTER PROGRAM PRODUCT, AND SYSTEM FOR DISPLAYING A THREE-DIMENSIONAL IMAGE OF AN ITEM TO A USER OF AN ONLINE CONCIERGE SYSTEM DURING ORDER FULFILLMENT

(71) Applicant: Maplebear Inc., San Francisco, CA (US)

(72) Inventor: Dylan Wang, Emeryville, CA (US)

(73) Assignee: Maplebear Inc., San Francisco, CA (US)

(*) Notice: Subject to any disclaimer, the term of this patent is extended or adjusted under 35 U.S.C. 154(b) by 25 days.

(21) Appl. No.: 17/846,698

(22) Filed: Jun. 22, 2022

(65) Prior Publication Data
US 2023/0419392 A1    Dec. 28, 2023

(51) Int. Cl.
G06Q 30/00     (2023.01)
G06Q 10/087    (2023.01)
G06Q 30/0601   (2023.01)

(52) U.S. Cl.
CPC ....... *G06Q 30/0643* (2013.01); *G06Q 10/087* (2013.01); *G06Q 30/0623* (2013.01)

(58) Field of Classification Search
USPC ..................................................... 705/27.2
See application file for complete search history.

(56) References Cited

U.S. PATENT DOCUMENTS

| | | | |
|---|---|---|---|
| 7,529,690 B2 | 5/2009 | Hadi | |
| 2012/0185356 A1* | 7/2012 | Barron | G06Q 10/08 705/26.61 |
| 2012/0185656 A1* | 7/2012 | Hong | G06F 3/0659 711/158 |
| 2013/0179296 A1 | 7/2013 | Paolini | |

(Continued)

FOREIGN PATENT DOCUMENTS

WO    WO 2014/033559 A1    3/2014

OTHER PUBLICATIONS

Menon, M., Pre-Pandemic State of Grocery Purchases Online: An Initiatory Review, 2021, Journal of Marketing Development and Competitiveness, 15(1), pp. 101-113. (Year: 2021).*

(Continued)

*Primary Examiner* — Jeffrey A. Smith
*Assistant Examiner* — Brittany E Bargeon
(74) *Attorney, Agent, or Firm* — Fenwick & West LLP

(57) ABSTRACT

An online concierge system receives multiple images of an item from a first client device associated with a shopper associated with the online concierge system, in which each of the images of the item is captured from a different angle and/or position and the item is included among an inventory of a warehouse associated with a retailer associated with the online concierge system. Based in part on the images of the item, the online concierge system generates a three-dimensional image of the item, in which the three-dimensional image of the item includes a dimension of the item and/or a color of the item. The online concierge system then sends the (Continued)

three-dimensional image of the item to a second client device associated with a customer of the online concierge system, in which a perspective of the three-dimensional image is modifiable within a display area of the second client device.

18 Claims, 12 Drawing Sheets

(56) References Cited

U.S. PATENT DOCUMENTS

| 2014/0100997 A1* | 4/2014 | Mayerle ............... G06T 19/006 |
| | | 705/27.2 |
| 2018/0158134 A1 | 6/2018 | Hassan |
| 2021/0224765 A1 | 7/2021 | Siddique et al. |

OTHER PUBLICATIONS

PCT International Search Report and Written Opinion, PCT Application No. PCT/US2022/049627, Feb. 14, 2023, 10 pages.

* cited by examiner

METHOD, COMPUTER PROGRAM PRODUCT, AND SYSTEM FOR DISPLAYING A THREE-DIMENSIONAL IMAGE OF AN ITEM TO A USER OF AN ONLINE CONCIERGE SYSTEM DURING ORDER FULFILLMENT

BACKGROUND

This disclosure relates generally to displaying an image of an item and more specifically to displaying a three-dimensional image of an item to a customer of an online concierge system during order fulfillment.

Online concierge systems allow customers to place online delivery orders and match the orders with delivery agents (i.e., shoppers) to fulfill the orders at physical retailers on behalf of the customers. Shoppers may fulfill orders by performing different tasks involved in fulfilling the orders, such as driving to retail stores, collecting items included in the orders, purchasing the items, and delivering the items to customers. While collecting items included in an order, a shopper may communicate with a customer to ensure that one or more of the items meet the customer's expectations.

Shoppers typically communicate with customers using communications services available for mobile devices. For example, if a customer orders one unit of bananas and includes instructions to select bananas that are almost ripe, a shopper may use a mobile device to call the customer or send a text message to the customer asking for clarification about whether one unit of bananas is one bunch of bananas or a single banana, whether they would like bananas that are slightly green, etc. In the above example, after receiving a response from the customer, the shopper also may use the mobile device to take a photograph of bananas that the shopper believes will meet the customer's expectations and send the photograph to the customer for the customer's approval.

However, the means by which shoppers typically communicate with customers may limit the ability of the customers to fully appreciate various characteristics of items, especially when the characteristics are described using subjective terms (e.g., "large," "almost ripe," "greenish," etc.), making it difficult for customers to identify potential issues with items collected by shoppers. In the above example, even if the customer approves of the bananas in the photograph received from the shopper, once the customer receives the bananas, the customer may be dissatisfied if the bananas have characteristics that were not discernible from the photograph. In this example, the customer may be disappointed if the bananas are much smaller than the customer expected, if there are imperfections that were not visible from the angle at which the photograph was taken, if the color of the actual bananas does not match the color of the bananas in the photograph, etc.

Furthermore, when communicating with shoppers, customers may feel pressured to respond quickly so that the shoppers may continue to perform the remaining tasks involved in fulfilling orders. For example, suppose that a shopper sends an image of an item to a customer and subsequently calls the customer, asking them to accept or reject the item. In this example, if the customer is busy and has not had adequate time to examine the photograph, the customer may accept the item even though they would have rejected it if the shopper had called them five minutes later when they would have had more time to examine the photograph.

SUMMARY

To improve the ability to communicate characteristics of items to customers and to provide customers more time to examine these characteristics, an online concierge system displays a three-dimensional image of an item to a customer of the online concierge system during order fulfillment, in accordance with one or more aspects of the disclosure. More specifically, the online concierge system receives multiple images of an item from a first client device associated with a shopper associated with the online concierge system, in which each of the images of the item is captured from a different angle and/or position and the item is included among an inventory of a warehouse associated with a retailer associated with the online concierge system. Based in part on the images of the item, the online concierge system generates a three-dimensional image of the item, in which the three-dimensional image of the item includes a dimension of the item and/or a color of the item. The online concierge system then sends the three-dimensional image of the item to a second client device associated with a customer of the online concierge system, in which a perspective of the three-dimensional image is modifiable within a display area of the second client device.

The figures depict embodiments of the present disclosure for purposes of illustration only. Alternative embodiments of the structures and methods illustrated herein may be employed without departing from the principles, or benefits touted, of the disclosure described herein.

DETAILED DESCRIPTION

System Architecture

Figure 1:
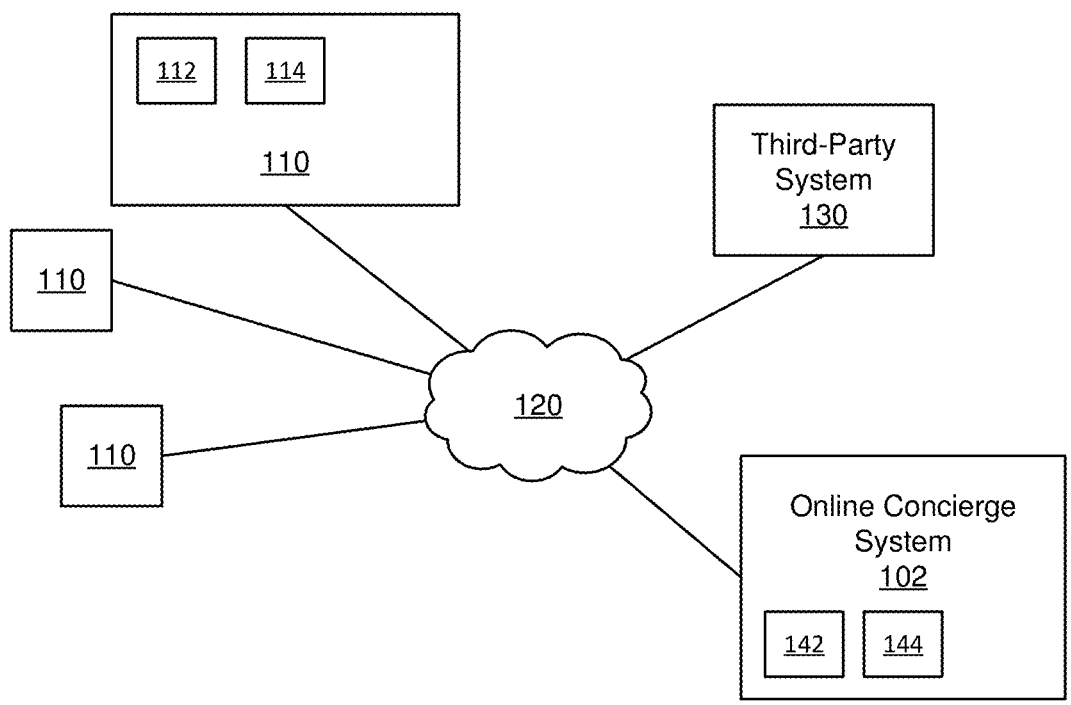
FIG. 1 is a block diagram of a system environment in which an online system, such as an online concierge system, operates, according to one or more embodiments.

FIG. 1 is a block diagram of a system environment 100 in which an online system, such as an online concierge system 102 as further described below in conjunction with FIGS. 2 and 3, operates. The system environment 100 shown in FIG. 1 comprises one or more client devices 110, a network 120, one or more third-party systems 130, and the online concierge system 102. In alternative configurations, different and/or additional components may be included in the system environment 100. Additionally, in other embodiments, the online concierge system 102 may be replaced by an online system configured to retrieve content for display to users and to transmit the content to one or more client devices 110 for display.

The client devices 110 are one or more computing devices capable of receiving user input as well as transmitting and/or receiving data via the network 120. In one embodiment, a client device 110 is a computer system, such as a desktop or a laptop computer. Alternatively, a client device 110 may be a device having computer functionality, such as a personal digital assistant (PDA), a mobile telephone, a smartphone, or another suitable device. In some embodiments, a client device 110 may be a shopping cart system, an inventory management system, an order fulfillment system, a checkout system, or any device capable of capturing images or receiving images captured by another device. A client device 110 is configured to communicate via the network 120. In one embodiment, a client device 110 executes an application allowing a user of the client device 110 to interact with the online concierge system 102. For example, the client device 110 executes a customer mobile application (CMA) 206 or a shopper mobile application (SMA) 212, as further described below in conjunction with FIGS. 4A and 4B, respectively, to enable interaction between the client device 110 and the online concierge system 102. As an additional example, a client device 110 executes a browser application to enable interaction between the client device 110 and the online concierge system 102 via the network 120. In another embodiment, a client device 110 interacts with the online concierge system 102 through an application programming interface (API) running on a native operating system of the client device 110, such as IOS® or ANDROID™.

A client device 110 includes one or more processors 112 configured to control operation of the client device 110 by performing various functions. In various embodiments, a client device 110 includes a memory 114 comprising a non-transitory storage medium on which instructions are encoded. The memory 114 may have instructions encoded thereon that, when executed by the processor 112, cause the processor 112 to perform functions to execute the customer mobile application 206 or the shopper mobile application 212 to provide the functions further described below in conjunction with FIGS. 4A and 4B, respectively.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third-party systems 130 may be coupled to the network 120 for communicating with the online concierge system 102 or with the client device(s) 110. In one embodiment, a third-party system 130 is an application provider communicating information describing applications for execution by a client device 110 or communicating data to client devices 110 for use by an application executing on the client device 110. In other embodiments, a third-party system 130 provides content or other information for presentation via a client device 110. For example, a third-party system 130 stores one or more web pages and transmits the web pages to a client device 110 or to the online concierge system 102. A third-party system 130 may also communicate information to the online concierge system 102, such as advertisements, content, or information about an application provided by the third-party system 130.

The online concierge system 102 includes one or more processors 142 configured to control operation of the online concierge system 102 by performing various functions. In various embodiments, the online concierge system 102 includes a memory 144 comprising a non-transitory storage medium on which instructions are encoded. The memory 144 may have instructions encoded thereon corresponding to the modules further described below in conjunction with FIG. 3 that, when executed by the processor 142, cause the processor 142 to perform the functionality further described below in conjunction with FIGS. 2 and FIGS. 5-9. For example, the memory 144 has instructions encoded thereon that, when executed by the processor 142, cause the processor 142 to display a three-dimensional image of an item to a customer of the online concierge system 102 during order fulfillment. Additionally, the online concierge system 102 includes a communication interface configured to connect the online concierge system 102 to one or more networks, such as network 120, or to otherwise communicate with devices (e.g., client devices 110) connected to the network(s).

One or more of a client device 110, a third-party system 130, or the online concierge system 102 may be special-purpose computing devices configured to perform specific functions, as further described below in conjunction with FIGS. 2-9, and may include specific computing components such as processors, memories, communication interfaces, and/or the like.

System Overview

Figure 2:
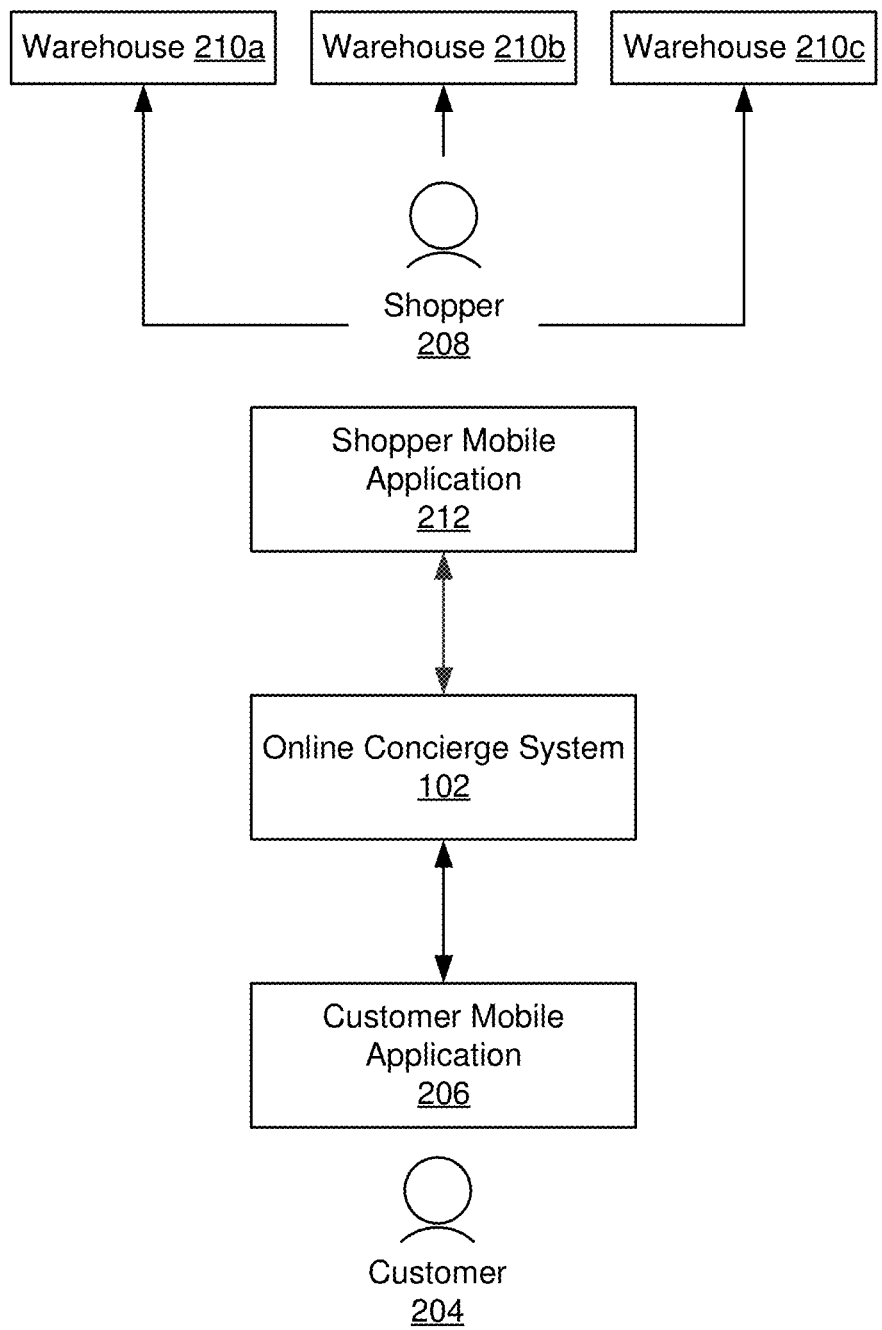
FIG. 2 illustrates an environment of an online concierge system, according to one or more embodiments.

FIG. 2 illustrates an environment 200 of an online platform, such as an online concierge system 102, according to one or more embodiments. The figures use like reference numerals to identify like elements. A letter after a reference numeral, such as "210*a*," indicates that the text refers specifically to the element having that particular reference numeral. A reference numeral in the text that is not followed by a letter, such as "210," refers to any or all of the elements in the figures bearing that reference numeral. For example, "210" in the text may refer to reference numerals "210*a*," "210*b*," and/or "210*c*" in the figures.

The environment 200 includes an online concierge system 102. The online concierge system 102 is configured to receive orders from one or more customers 204 (only one is shown for the sake of simplicity). An order specifies a list of goods (items or products) to be delivered to a customer 204. An order also specifies a location to which goods are to be delivered, and a time window during which the goods should be delivered. In some embodiments, an order specifies one or more retailers from which goods should be purchased. A customer 204 may use a customer mobile application (CMA) 206, which is configured to communicate with the online concierge system 102, to place an order.

The online concierge system 102 is configured to transmit orders received from customers 204 to one or more shoppers 208. A shopper 208 may be a person (e.g., a contractor, an employee, etc.), an entity, or an autonomous device (e.g., a robot) enabled to fulfill orders received by the online concierge system 102. A shopper 208 travels between a warehouse 210 and a delivery location (e.g., a customer's home or office) and may do so by car, truck, bicycle, scooter, foot, or via any other mode of transportation. In some embodiments, a delivery may be partially or fully automated, e.g., using a self-driving car. The environment 200 also includes three warehouses 210*a*, 210*b*, and 210*c* (while only three are shown for the sake of simplicity, the environment 200 may include hundreds of warehouses 210). The warehouses 210 may be physical retailers, such as grocery stores, discount stores, department stores, etc., or non-public warehouses 210 storing items that may be collected and delivered to customers 204. Each shopper 208 fulfills an order received from the online concierge system 102 at one or more warehouses 210, delivers the order to a customer 204, or performs both fulfillment and delivery. In one embodiment, shoppers 208 make use of a shopper mobile application 212 which is configured to interact with the online concierge system 102.

Figure 3:
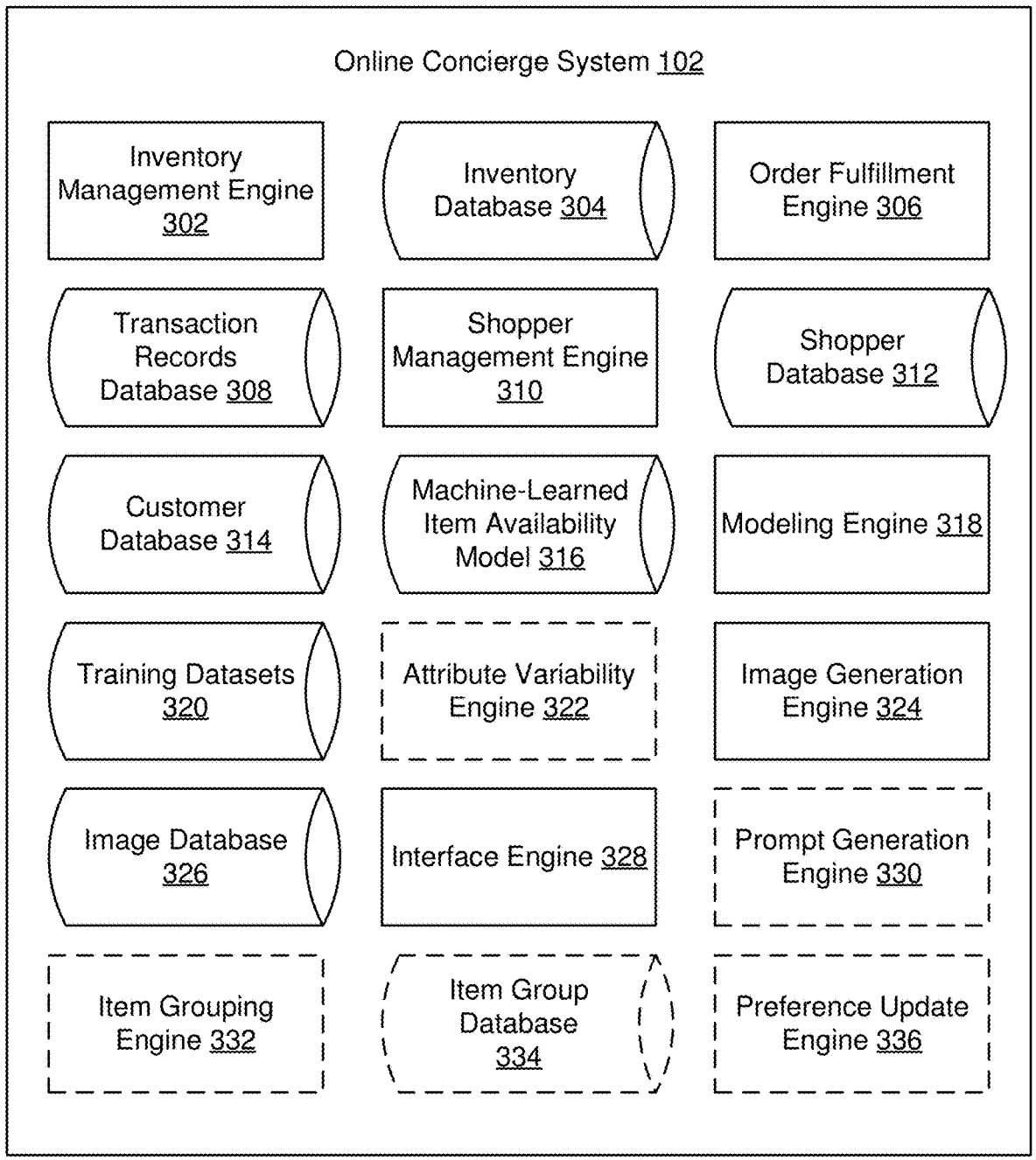
FIG. 3 is a diagram of an online concierge system, according to one or more embodiments.

FIG. 3 is a diagram of an online concierge system 102, according to one or more embodiments. In various embodiments, the online concierge system 102 may include different or additional modules than those described in conjunction with FIG. 3. Furthermore, in some embodiments, the online concierge system 102 includes fewer modules than those described in conjunction with FIG. 3.

The online concierge system 102 includes an inventory management engine 302, which interacts with inventory systems associated with each warehouse 210. In one embodiment, the inventory management engine 302 requests and receives inventory information maintained by a warehouse 210. The inventory of each warehouse 210 is unique and may change over time. The inventory management engine 302 monitors changes in inventory for each participating warehouse 210. The inventory management engine 302 is also configured to store inventory records in an inventory database 304. The inventory database 304 may store information in separate records—one for each participating warehouse 210—or may consolidate or combine inventory information into a unified record. Inventory information includes attributes of items that include both qualitative and quantitative information about the items, including size, color, weight, SKU, serial number, etc. In one embodiment, the inventory database 304 also stores purchasing rules associated with each item, if they exist. For example, age-restricted items such as alcohol and tobacco are flagged accordingly in the inventory database 304. Additional inventory information useful for predicting the availability of items may also be stored in the inventory database 304. For example, for each item-warehouse combination (a particular item at a particular warehouse 210), the inventory database 304 may store a time that the item was last found, a time that the item was last not found (e.g., if a shopper 208 looked for the item but could not find it), a rate at which the item is found, and a popularity of the item. In embodiments in which the inventory management engine 302 receives an item catalog from a warehouse 210 identifying items offered for purchase by the warehouse 210, one or more images of each item included in the item catalog may be stored in the inventory database 304 in association with various types of information (e.g., information identifying the item and the warehouse 210, a date that the catalog was received, etc.).

For each item, the inventory database 304 identifies one or more attributes of the item and corresponding values for each attribute of the item. For example, the inventory database 304 includes an entry for each item offered by a warehouse 210, in which an entry for an item includes an item identifier that uniquely identifies the item. The entry includes different fields, with each field corresponding to an attribute of the item. A field of an entry includes a value for an attribute corresponding to the field, allowing the inventory database 304 to maintain values of different attributes for various items.

In various embodiments, the inventory management engine 302 maintains a taxonomy of items offered for purchase by one or more warehouses 210. For example, the inventory management engine 302 receives an item catalog from a warehouse 210 identifying items offered for purchase by the warehouse 210. From the item catalog, the inventory management engine 302 determines a taxonomy of items offered by the warehouse 210, in which different levels of the taxonomy provide different levels of specificity about items included in the levels. In various embodiments, the taxonomy identifies a category and associates one or more specific items with the category. For example, a category identifies "milk," and the taxonomy associates identifiers of different milk items (e.g., milk offered by different brands, milk having one or more different attributes, etc.) with the category. Thus, the taxonomy maintains associations between a category and specific items offered by the warehouse 210 matching the category. In some embodiments, different levels of the taxonomy identify items with differing levels of specificity based on any suitable attribute or combination of attributes of the items. For example, different levels of the taxonomy specify different combinations of attributes of items, so items in lower levels of the hierarchical taxonomy have a greater number of attributes, corresponding to greater specificity in a category, while items in higher levels of the hierarchical taxonomy have a fewer number of attributes, corresponding to less specificity in a category. In various embodiments, higher levels of the taxonomy include fewer details about items, so greater numbers of items are included in higher levels (e.g., higher levels include a greater number of items satisfying a broader category). Similarly, lower levels of the taxonomy include greater details about items, so fewer numbers of items are included in the lower levels (e.g., lower levels include a fewer number of items satisfying a more specific category). The taxonomy may be received from a warehouse 210 in various embodiments. In other embodiments, the inventory management engine 302 applies a trained classification model to an item catalog received from a warehouse 210 to include different items in levels of the taxonomy, so application of the trained classification model associates specific items with categories corresponding to levels within the taxonomy.

Inventory information provided by the inventory management engine 302 may supplement training datasets 320. Inventory information provided by the inventory management engine 302 may not necessarily include information about the outcome of fulfilling a delivery order associated with the item, whereas the data within the training datasets 320 is structured to include an outcome of fulfilling a delivery order (e.g., if an item in an order was or was not collected).

The online concierge system 102 also includes an order fulfillment engine 306 which is configured to synthesize and display an ordering interface to each customer 204 (for example, via the customer mobile application 206). The order fulfillment engine 306 is also configured to access the inventory database 304 in order to determine which items are available at which warehouse 210. The order fulfillment engine 306 may supplement the item availability information from the inventory database 304 with item availability information predicted by a machine-learned item availability model 316. The order fulfillment engine 306 determines a sale price for each item ordered by a customer 204. Prices set by the order fulfillment engine 306 may or may not be identical to in-store prices determined by retailers (which is the price that customers 204 and shoppers 208 would pay at the retail warehouses 210). The order fulfillment engine 306 also facilitates transactions associated with each order. In one embodiment, the order fulfillment engine 306 charges a payment instrument associated with a customer 204 when he/she places an order. The order fulfillment engine 306 may transmit payment information to an external payment gateway or payment processor. The order fulfillment engine 306 stores payment and transactional information associated with each order in a transaction records database 308.

In various embodiments, the order fulfillment engine 306 generates and transmits a search interface to a client device 110 of a customer 204 for display via the customer mobile application 206. The order fulfillment engine 306 receives a query comprising one or more terms from a customer 204 and retrieves items satisfying the query, such as items having descriptive information matching at least a portion of the query. In various embodiments, the order fulfillment engine 306 leverages item embeddings for items to retrieve items based on a received query. For example, the order fulfillment engine 306 generates an embedding for a query and determines measures of similarity between the embedding for the query and item embeddings for various items included in the inventory database 304.

In some embodiments, the order fulfillment engine 306 also shares order details with warehouses 210. For example, after successful fulfillment of an order, the order fulfillment engine 306 may transmit a summary of the order to the appropriate warehouses 210. Details of an order may indicate the items purchased, a total value of the items, and in some cases, an identity of a shopper 208 and a customer 204 associated with the order. In one embodiment, the order fulfillment engine 306 pushes transaction and/or order details asynchronously to retailer systems. This may be accomplished via the use of webhooks, which enable programmatic or system-driven transmission of information between web applications. In another embodiment, retailer systems may be configured to periodically poll the order fulfillment engine 306, which provides details of all orders which have been processed since the last request.

The order fulfillment engine 306 may interact with a shopper management engine 310, which manages communication with and utilization of shoppers 208. In one embodiment, the shopper management engine 310 receives a new order from the order fulfillment engine 306. The shopper management engine 310 identifies the appropriate warehouse 210 to fulfill the order based on one or more parameters, such as a probability of item availability determined by the machine-learned item availability model 316, the contents of the order, the inventory of the warehouses 210, and the proximity of the warehouses 210 to the delivery location. The shopper management engine 310 then identifies one or more appropriate shoppers 208 to fulfill the order based on one or more parameters, such as the shoppers' proximity to the appropriate warehouse 210 (and/or to the customer 204), his/her familiarity level with that particular warehouse 210, etc. Additionally, the shopper management engine 310 accesses a shopper database 312 which stores information describing each shopper 208, such as his/her name, gender, rating, previous shopping history, etc.

As part of fulfilling an order, the order fulfillment engine 306 and/or shopper management engine 310 may access a customer database 314, which stores information describing each customer 204. This information may include each customer's name, address, gender, shopping preferences, favorite items, stored payment instruments, etc. In some embodiments, shopping preferences stored in the customer database 314 also may include one or more preferences of a customer 204 for various items. Preferences for items may describe types, qualities, quantities, colors, sizes, brands, manufacturing locations, ingredients, packaging, or any other attributes that may be associated with items. For example, the customer database 314 may store information describing a preference of a customer 204 for certain types of milk (e.g., oat and soy) and for mangoes that are red and yellow. As an additional example, the customer database 314 may store information describing a preference of a customer 204 for a particular brand of coffee creamer, a range of a number of bananas included in a bunch, and a minimum number of days between an expiration date and a current date for dairy items.

In some embodiments, shopping preferences stored in the customer database 314 also may include a customer's dislike for various items. For example, if a customer 204 is allergic to peanuts, information stored in the customer database 314 may indicate that the customer 204 dislikes peanuts and any items that include peanuts as an ingredient. As an additional example, if a customer 204 previously reported a problem with an order, in which organic blueberries requested by the customer 204 were unavailable and were replaced with non-organic blueberries and the customer 204 indicated that the replacement items were poor replacements, information stored in the customer database 314 may indicate that the customer 204 dislikes non-organic blueberries. As further described below, a customer's preferences and/or dislikes for items may be updated by the preference update engine 336 based on information received from the customer 204 (e.g., via the preferences management interface 406 of the CMA 206 or in a response to a prompt sent to a client device 110 associated with the customer 204).

In various embodiments, the order fulfillment engine 306 determines whether to delay display of a received order to shoppers 208 for fulfillment by a time interval. In response to determining to delay display of the received order by a time interval, the order fulfilment engine 306 evaluates subsequent orders received during the time interval for inclusion in one or more batches that also include the received order. After the time interval, the order fulfillment engine 306 displays the order to one or more shoppers 208 via the shopper mobile application 212; if the order fulfillment engine 306 generated one or more batches including the received order and one or more subsequent orders received during the time interval, the batch(es) is/are also displayed to one or more shoppers 208 via the shopper mobile application 212.

Machine Learning Models

The online concierge system 102 further includes the machine-learned item availability model 316, a modeling engine 318, and the training datasets 320. The modeling engine 318 uses the training datasets 320 to generate the machine-learned item availability model 316. The machine-learned item availability model 316 may learn from the training datasets 320, rather than follow only explicitly programmed instructions. The inventory management engine 302, order fulfillment engine 306, and/or shopper management engine 310 may use the machine-learned item availability model 316 to determine a probability that an item is available at a warehouse 210. The machine-learned item availability model 316 may be used to predict item availability for items being displayed to or selected by a customer 204 or included in received delivery orders. A single machine-learned item availability model 316 is used to predict the availability of any number of items.

The machine-learned item availability model 316 may be configured to receive, as inputs, information about an item, a warehouse 210 for collecting the item, and a time for collecting the item. The machine-learned item availability model 316 may be adapted to receive any information that the modeling engine 318 identifies as an indicator of item availability. At a minimum, the machine-learned item availability model 316 receives information about an item-warehouse pair, such as an item in a delivery order and a warehouse 210 at which the order may be fulfilled. Items stored in the inventory database 304 may be identified by item identifiers. As described above, various characteristics, some of which are specific to a warehouse 210 (e.g., a time that an item was last found in the warehouse 210, a time that the item was last not found in the warehouse 210, a rate at which the item is found, a popularity of the item, etc.) may be stored for each item in the inventory database 304. Similarly, each warehouse 210 may be identified by a warehouse identifier and stored in a warehouse database along with information about the warehouse 210. A particular item at a particular warehouse 210 may be identified using an item identifier and a warehouse identifier. In other embodiments, the item identifier refers to a particular item at a particular warehouse 210, so that the same item at two different warehouses 210 is associated with two different identifiers. For convenience, both of these options to identify an item at a warehouse 210 are referred to herein as an "item-warehouse pair." Based on the identifier(s), the online concierge system 102 may extract information about the item and/or warehouse 210 from the inventory database 304 and/or warehouse database and provide this extracted information as inputs to the machine-learned item availability model 316.

The machine-learned item availability model 316 contains a set of functions generated by the modeling engine 318 from the training datasets 320 that relate an item, a warehouse 210, timing information, and/or any other relevant inputs, to a probability that the item is available at the warehouse 210. Thus, for a given item-warehouse pair, the machine-learned item availability model 316 outputs a probability that the item is available at the warehouse 210. The machine-learned item availability model 316 constructs a relationship between the item-warehouse pair, the timing information, and/or any other inputs and the probability of availability (also referred to as "availability") that is generic enough to apply to any number of different item-warehouse pairs. In some embodiments, the probability output by the machine-learned item availability model 316 includes a confidence score. The confidence score may be the error or uncertainty score of the probability of availability and may be calculated using any standard statistical error measurement. In some embodiments, the confidence score is based in part on whether the item-warehouse pair availability prediction was accurate for previous delivery orders (e.g., if an item was predicted to be available at a warehouse 210 and was not found by a shopper 208 or was predicted to be unavailable but was found by the shopper 208). In various embodiments, the confidence score is based in part on the age of the data for the item (e.g., if availability information has been received within the past hour or the past day). The set of functions of the machine-learned item availability model 316 may be updated and adapted following retraining with new training datasets 320. The machine-learned item availability model 316 may be any machine learning model, such as a neural network, a boosted tree, a gradient-boosted tree, or a random forest model. In some embodiments, the machine-learned item availability model 316 is generated from the XGBoost algorithm. The probability of availability of an item generated by the machine-learned item availability model 316 may be used to determine instructions delivered to a customer 204 and/or shopper 208, as described in further detail below.

The training datasets 320 relate a variety of different factors to known item availabilities from the outcomes of previous delivery orders (e.g., if an item was previously found or previously unavailable). The training datasets 320 include items included in previous delivery orders, whether the items in the previous delivery orders were collected, warehouses 210 associated with the previous delivery orders, and a variety of characteristics associated with each of the items, which may be obtained from the inventory database 304. Each piece of data in the training datasets 320 includes an outcome of a previous delivery order (e.g., whether an item was collected). Item characteristics may be determined by the machine-learned item availability model 316 to be statistically significant factors predictive of an item's availability. Item characteristics that are predictors of availability may be different for different items. For example, an item type factor might be the best predictor of availability for dairy items, whereas a time of day may be the best predictive factor of availability for vegetables. For each item, the machine-learned item availability model 316 may weight these factors differently, in which the weights are a result of a "learning" or a training process on the training datasets 320. The training datasets 320 are very large datasets taken across a wide cross section of warehouses 210, shoppers 208, items, delivery orders, times, and item characteristics. The training datasets 320 are large enough to provide a mapping from an item in an order to a probability that the item is available at a warehouse 210. In addition to previous delivery orders, the training datasets 320 may be supplemented by inventory information provided by the inventory management engine 302. In some embodiments, the training datasets 320 are historical delivery order information used to train the machine-learned item availability model 316, whereas the inventory information stored in the inventory database 304 includes factors input into the machine-learned item availability model 316 to determine an item availability for an item in a newly received delivery order. In various embodiments, the modeling engine 318 may evaluate the training datasets 320 to compare a single item's availability across multiple warehouses 210 to determine if an item is chronically unavailable, which may indicate that the item is no longer manufactured. The modeling engine 318 may query a warehouse 210 through the inventory management engine 302 for updated item information about any such items.

Machine Learning Factors

The training datasets 320 include times associated with previous delivery orders. In some embodiments, the training datasets 320 include a time of day at which each previous delivery order was placed. Item availability may be impacted by time of day since items that are otherwise regularly stocked by warehouses 210 may become unavailable during high-volume shopping times. In addition, item availability may be affected by restocking schedules. For example, if a warehouse 210 mainly restocks items at night, item availability at the warehouse 210 will tend to decrease over the course of the day. Additionally, or alternatively, the training datasets 320 include a day of the week that previous delivery orders were placed. The day of the week may impact item availability since warehouses 210 may have reduced item inventory on popular shopping days and restocking shipments may be received on particular days. In some embodiments, the training datasets 320 include a time interval since an item was previously collected for a previous delivery order. If an item has recently been collected at a warehouse 210, this may increase the probability that it is still available. If a long interval of time has elapsed since an item has been collected, this may indicate that the probability that the item is available for subsequent orders is low or uncertain. In some embodiments, the training datasets 320 include a time interval since an item in a previous delivery order was not found. If a short interval of time has elapsed since an item was not found, this may indicate that there is a low probability that the item will be available for subsequent delivery orders. Conversely, if a long interval of time has elapsed since an item was not found, this may indicate that the item may have been restocked and will be available for subsequent delivery orders. In some embodiments, the training datasets 320 may also include a rate at which an item is typically found by a shopper 208 at a warehouse 210, a number of days since inventory information about the item was last received from the inventory management engine 302, a number of times the item was not found during a previous week, or any number of additional rate-related or time-related information. Relationships between this rate-related and/or time-related information and item availability are determined by the modeling engine 318, which trains a machine learning model with the training datasets 320, producing the machine-learned item availability model 316.

The training datasets 320 include item characteristics. In some embodiments, the item characteristics include a department associated with an item. For example, if an item is yogurt, it is associated with a dairy department. Examples of departments include bakery, beverage, nonfood, pharmacy, produce, floral, deli, prepared foods, meat, seafood, dairy, or any other categorization of items used by a warehouse 210. A department associated with an item may affect item availability since different departments have different item turnover rates and inventory levels. In some embodiments, the item characteristics include an aisle of a warehouse 210 associated with an item. The aisle of the warehouse 210 may affect item availability since different aisles of a warehouse 210 may be re-stocked more frequently than others. Additionally, or alternatively, the item characteristics may include an item popularity score. The item popularity score for an item may be proportional to the number of delivery orders received that include the item. An alternative or additional item popularity score may be provided by a retailer through the inventory management engine 302. In some embodiments, the item characteristics include a product type associated with an item. For example, if an item is a particular brand of a product, the product type will be a generic description of the product type, such as "milk" or "eggs." The product type may affect item availability since certain product types may have higher turnover and re-stocking rates than others or may have larger inventories in the warehouses 210. In some embodiments, the item characteristics may include a number of times a shopper 208 was instructed to keep looking for an item after he or she was initially unable to find the item, a total number of delivery orders received for an item, whether or not an item is organic, vegan, gluten free, or any other characteristics associated with an item. The relationships between item characteristics and item availability are determined by the modeling engine 318, which trains a machine learning model with the training datasets 320, producing the machine-learned item availability model 316.

The training datasets 320 may include additional item characteristics that affect item availability and may therefore be used to build the machine-learned item availability model 316 relating a delivery order including an item to the item's predicted availability. The training datasets 320 may be periodically updated with recent delivery orders. The training datasets 320 may be updated with item availability information provided directly from shoppers 208. Following updating of the training datasets 320, the modeling engine 318 may retrain a model with the updated training datasets 320 and produce a new machine-learned item availability model 316.

Three-Dimensional Image Components

In some embodiments, the online concierge system 102 further includes an attribute variability engine 322. The attribute variability engine 322 determines whether one or more attributes of an item are variable based in part on information identifying the item. Information identifying an item may be received by the order fulfillment engine 306 from a client device 110 associated with a customer 204 of the online concierge system 102 (e.g., in an order or in a request to view additional information associated with the item while browsing items in a web-based marketplace provided by the online concierge system 102). In some embodiments, attributes of an item that are variable include a shape of the item (e.g., round, oval, irregular, etc.), a dimension of the item (e.g., length, height, diameter, etc.), a quantity of the item (e.g., number, volume, or weight of the item), a quality of the item (e.g., freshness, ripeness, number of imperfections, etc.), a color of the item, etc. In various embodiments, the attribute variability engine 322 determines whether one or more attributes of an item are variable based on information stored in the inventory database 304. For example, the attribute variability engine 322 may access the inventory database 304 and determine whether the inventory database 304 includes multiple values or ranges of values describing qualitative or quantitative information about the item, such as its size, color, or weight.

In various embodiments, attributes of items may be identified by a taxonomy maintained by the inventory management engine 302 described above. In such embodiments, the attribute variability engine 322 may access the taxonomy and determine whether one or more attributes associated with a category in which an item is included are variable. For example, if an item is a watermelon, a category associated with the item may indicate that it is a produce item and attributes associated with the category indicate that different watermelons may vary in shape, color, freshness, ripeness, size, number of imperfections, and weight. In this example, the attribute variability engine 322 may determine that one or more attributes of the item are therefore variable. As an additional example, if an item is a box of cereal, a category associated with the item may indicate that it is a pre-packaged item and attributes associated with the category indicate that all boxes of the cereal should therefore be of a standard shape, size, weight, etc. In this example, the attribute variability engine 322 may determine that one or more attributes of the item are therefore not variable.

The online concierge system 102 also includes an image generation engine 324. The image generation engine 324 generates a three-dimensional image of a physical item that includes one or more visual aspects of the item, such as one or more dimensions of the item, one or more edges, angles, surfaces, and/or contours of the item, one or more colors of the item, text included on the item, images included on the item, or any other suitable visual aspects of the item. For example, if an item is a physical cereal box, the image generation engine 324 may generate a three-dimensional image of the cereal box that has multiple flat surfaces connected at right angles, in which the surfaces have dimensions (i.e., a length, a height, and a width) corresponding to those of the physical cereal box. In the above example, the three-dimensional image of the cereal box also may include colors, text, images, etc. that are included on the physical cereal box (e.g., the name of the cereal, the manufacturer's logo, nutritional information, ingredients, an image of a bowl of the cereal, etc.), such that the three-dimensional image of the cereal box appears identical to the physical cereal box when viewed from the same angles and/or positions.

The image generation engine 324 may generate a three-dimensional image of an item based on multiple images of the item, in which each of the images of the item is captured from a different position (e.g., a different height relative to the ground or the item) and/or a different angle (e.g., a different angle relative to the ground or the item). For example, the image generation engine 324 may generate a three-dimensional image of a retail item based on multiple images of the item captured by a camera, in which the item is rotated clockwise and/or counterclockwise about one or more axes as the images are captured. Alternatively, in the above example, the image generation engine 324 may generate the three-dimensional image of the retail item based on multiple images of the item captured by the camera, in which the camera is moved around the item as the images are captured. In some embodiments, images of an item used to generate a three-dimensional image of an item are included in a catalog stored in the inventory database 304. In the above example, the image generation engine 324 may access the inventory database 304 to retrieve the images, in which the images are included in an item catalog received from a warehouse 210 identifying items offered for purchase by the warehouse 210 and are stored in association with various types of information (e.g., information identifying the item and the warehouse 210, a date that the catalog was received, etc.). Furthermore, in some embodiments, at least some of the images may overlap with each other. In the above example, if the item is a carton of eggs, at least some images of the carton may overlap with each other, such that the same portion of the carton is depicted from different positions or angles. In various embodiments, images of an item used by the image generation engine 324 to generate a three-dimensional image of the item may be included in a video of the item. For example, multiple images of an item may correspond to different frames of a video of the item captured by a camera as the camera is moved around the item. In some embodiments, the image generation engine 324 may select the highest quality images of an item based on various characteristics of each image (e.g., image resolution, size, noise, etc.) and generate a three-dimensional image of the item based on the selected images. For example, of five images of an item, the image generation engine 324 may select three of the highest quality images and generate a three-dimensional image of the item based on the three selected images.

Images of an item used by the image generation engine 324 to generate a three-dimensional image of an item may be captured by one or more devices. Examples of devices that may be used to capture images of an item include a camera, a shopping cart system, an inventory management system, an order fulfillment system, a checkout system, a mobile device, etc. For example, a shopping cart system may include multiple cameras mounted along the perimeter of a shopping cart that capture images of each item added to the shopping cart from different angles as the item is added to the shopping cart. As an additional example, in a non-public warehouse 210 that stores items that may be collected and delivered to customers 204, images of an item may be captured by an inventory management system that keeps track of each item included in the inventory. In this example, the inventory management system may include one or more cameras that capture images of the item from different angles as it is added to the inventory of the warehouse 210. As yet another example, an order fulfillment system, such as an autonomous device (e.g., a robot) that collects items included in an order, may include one or more cameras that capture images of items from different angles as they are collected at a warehouse 210. As an additional example, a checkout system may include a platform on which items to be purchased are set and multiple cameras that surround the platform capture images of the items from different angles and/or positions during a checkout process to identify the items. As another example, a smartphone associated with a shopper 208 of the online concierge system 102 may include multiple cameras that are clustered on the back of the smartphone, which may be used by the shopper 208 to capture images of an item simultaneously from slightly different angles and/or positions. A camera used to capture an image of an item may have various functionalities (e.g., infrared, image stabilization, etc.). In the above example, one or more of the cameras of the client device 110 also may be infrared cameras, which provide additional depth perception information about the item.

In various embodiments, the image generation engine 324 may generate a three-dimensional image of an item based in part on information associated with a device used to capture images of the item. In such embodiments, information associated with the device may include information associated with one or more cameras included on the device. For example, the image generation engine 324 may generate a three-dimensional image of an item based on multiple overlapping images of the item, information describing a position and/or an angle of a camera of a client device 110 used to capture each image, and information describing characteristics of the camera (e.g., focal length, pixel size, lens distortion, etc.). In embodiments in which devices used to capture images of items are included in warehouses 210, the image generation engine 324 may receive information associated with the devices from entities associated with the warehouses 210 (e.g., retailers). For example, if images of an item are captured by cameras included on one or more devices, such as a shopping cart system, an order fulfillment system, an inventory management system, and/or a checkout system at a warehouse 210 associated with a retailer, the image generation engine 324 may generate a three-dimensional image of the item based on the images and information associated with the device(s) received from the retailer. Information associated with a device used to capture images of an item also or alternatively may be received from the device. For example, if images of an item are captured by cameras included on a smartphone associated with a shopper 208 of the online concierge system 102, metadata associated with the smartphone, such as characteristics of the cameras (e.g., focal length, pixel size, lens distortion, etc.), may be received from the smartphone (e.g., via the SMA 212) and used to generate a three-dimensional image of the item.

In some embodiments, one or more images of an item used by the image generation engine 324 to generate a three-dimensional image of the item may be enhanced. An image may be enhanced using various techniques, including color correction, noise removal, etc. In some embodiments, an image may be enhanced by the image generation engine 324. For example, the image generation engine 324 may receive images of an item captured by a client device 110 of a shopper 208 using a photo studio application associated with the online concierge system 102. In this example, the image generation engine 324 may then enhance the images by sharpening them, adjusting their brightness, etc. and use the highest quality images of the item to generate a three-dimensional image of the item. In various embodiments, an image also or alternatively may be processed by an application or tool that automatically enhances images. For example, an image of an item may be captured using an application or tool that performs white balancing by adjusting colors of the image to match the color of the light source so that white objects in the image appear white.

In various embodiments, a three-dimensional image of an item is generated by the image generation engine 324 based in part on one or more reference dimensions included in one or more images of the item. Reference dimensions may correspond to known or specified dimensions (e.g., lengths, heights, widths, diameters, etc.). For example, a length indicated by a ruler included in an image of an item may serve as a reference dimension. As an additional example, suppose that an item is placed in a shopping cart of a shopping cart system, in which a length of the shopping cart is known. In this example, if an image of the interior of the shopping cart is captured from end-to-end with the item in the shopping cart, the length of the shopping cart may serve as a reference dimension. As yet another example, suppose that an item is placed on a round platform of a checkout system, in which a diameter of the platform is known. In this example, if an image of the item on the platform is captured, the diameter of the platform may serve as a reference dimension.

In various embodiments, a three-dimensional image of an item is generated by the image generation engine 324 based in part on one or more reference colors included in one or more images of the item. Reference colors may correspond to known or specified colors identified by a color scheme such as the red/green/blue (RGB) scheme. For example, if RGB values of a color included in a color palette captured in an image of an item are known, the color may serve as a reference color. As an additional example, if an item is an apple and an image of the apple next to a cereal box is captured, in which RGB values of colors of the cereal box are known, each of the colors of the cereal box may serve as a reference color.

The image generation engine 324 may generate a three-dimensional image of an item using photogrammetry, laser scanning, infrared (IR) thermography, or any other suitable technique or combination of techniques. In embodiments in which the image generation engine 324 generates a three-dimensional image of an item using photogrammetry, one or more images of the item used by the image generation engine 324 to generate the three-dimensional image may overlap with each other and be taken at different positions and/or angles. Furthermore, in such embodiments, the image generation engine 324 may perform various steps to generate the three-dimensional image (e.g., three-dimensional mesh generation, image matching, feature extraction, triangulation, etc.). For example, using photogrammetry, the image generation engine 324 may generate a three-dimensional image of an item by computing the position of a point on the item in three-dimensional space using multiple images of the item captured at different positions and/or angles. In various embodiments, the image generation engine 324 may generate a three-dimensional image of an item based on a single image of the item. In such embodiments, the image generation engine 324 may do so based on additional information included in the image. For example, if an image of an item includes a reference dimension, the image generation engine 324 may determine one or more dimensions of the item and use photogrammetric techniques to generate a three-dimensional image of the item based on the image and the dimension(s).

In various embodiments, the image generation engine 324 is configured to store three-dimensional images of physical items it generates in an image database 326. Each three-dimensional image of an item may be stored in the image database 326 in association with various types of information associated with the three-dimensional image. For example, a three-dimensional image of an item may be stored in association with information identifying the item (e.g., an item identifier, a SKU, serial number, etc.), a date and/or time it was generated, information identifying a warehouse 210 at which images of the item used to generate the three-dimensional image were captured, and information describing one or more devices used to capture the images.

The online concierge system 102 also includes an interface engine 328. The interface engine 328 sends three-dimensional images of items to client devices 110 associated with customers 204 of the online concierge system 102 (e.g., via the CMA 206). A client device 110 to which the interface engine 328 sends a three-dimensional image of an item may be a mobile device (e.g., a smartphone or a tablet), a laptop or a desktop computer, a virtual reality device, an augmented reality device, or any other device that includes a display area. For example, if the interface engine 328 sends a three-dimensional image of an item to a client device 110 that is a virtual reality device or an augmented reality device, the three-dimensional image of the item is rendered in a virtual reality environment or an augmented reality environment, respectively.

Furthermore, in some embodiments, a three-dimensional image of an item may be included among three-dimensional images of multiple items sent to a client device 110 associated with a customer 204 (e.g., to allow the customer 204 to view the contents of their entire order and quickly identify any issues with the items). In such embodiments, the three-dimensional image of an item may be included among three-dimensional images of items included in the same order (e.g., in a three-dimensional image of a shopping cart or shopping basket used to hold the items), one or more groups of three-dimensional images of items included in the same order, etc. For example, if the interface engine 328 sends a three-dimensional image of an item to a client device 110 that is a virtual reality device, the three-dimensional image of the item may be presented in a three-dimensional shopping cart, along with three-dimensional images of other items included in the same order. In the above example, if the client device 110 is an augmented reality device, the three-dimensional image of the item may be presented along with the three-dimensional images of other items included in the same order on various surfaces (e.g., shelves of a refrigerator or a pantry, on a kitchen counter, etc.) when the surfaces are presented in a display area of the client device 110.

In embodiments in which a three-dimensional image of an item is rendered in an augmented reality environment, the three-dimensional image of the item may be scaled by the interface engine 328 based on one or more additional items identified within the display area of the client device 110. In such embodiments, the interface engine 328 may detect each additional item within the display area, identify the item, and scale the three-dimensional image of the item based on one or more known dimensions of the identified item. For example, if the interface engine 328 sends a three-dimensional image of an item to a client device 110 that is an augmented reality device, in which the item is a carton of milk, the three-dimensional image of the carton of milk is rendered so it appears on a shelf of a refrigerator that is presented in a display area of the client device 110. In this example, if an additional item, such as a box of juice, is detected within the display area of the client device 110, the interface engine 328 may access the inventory database 304 and identify the additional item as the box of juice if it has at least a threshold measure of similarity to one or more images of the box of juice included in an item catalog. In the above example, the interface engine 328 also or alternatively may access the image database 326 and identify the additional item as the box of juice if it has at least a threshold measure of similarity to a three-dimensional image of the box of juice previously generated by the image generation engine 324. In this example, the interface engine 328 may then scale the three-dimensional image of the carton of milk based on one or more known dimensions of the box of juice, such that the size of the carton of milk is accurately represented based on the size of the box of juice.

The perspective of each three-dimensional image of an item that is sent to a client device 110 may be modifiable within a display area of the client device 110 (e.g., so that different views of the item, such as plan views, elevation views, orthographic views, etc. are displayed within the display area of the client device 110). The perspective of a three-dimensional image of an item may be modified by rotating the three-dimensional image about one or more axes, by changing a viewing angle along one or more axes, and/or by changing a viewing position relative to the three-dimensional image of the item. For example, if a three-dimensional image of an item is sent to a client device 110 that is a smartphone or a tablet, a perspective of the three-dimensional image of the item may be modified within a display area of the client device 110 by rotating the three-dimensional image of the item about one or more axes (e.g., by swiping across a display area of the client device 110, tapping on one or more buttons included in the display area, etc.). In the above example, the perspective of the three-dimensional image of the item also may be modified by zooming in or zooming out (e.g., by stretching two fingers apart or pinching two fingers together on the display area). As an additional example, if a three-dimensional image of an item is sent to a client device 110 that is a virtual reality device or an augmented reality device, the perspective of the three-dimensional image may be modified within a display area (e.g., a headset) of the client device 110 by using one or more controllers, haptic gloves, etc. to pick up, move, and rotate the item. In the above example, the perspective of the three-dimensional image of the item also or alternatively may be modified by pivoting a display area of the client device 110 to change a viewing angle along one or more axes and/or by moving a position of the display area to change a viewing position relative to the three-dimensional image of the item.

In some embodiments, a three-dimensional image of an item that is sent to a client device 110 may be annotated by a user of the client device 110. A three-dimensional image of an item may be annotated with comments, markups, etc. that reference one or more portions of the three-dimensional image of the item. For example, suppose that a customer 204 rejects an item selected by a shopper 208 based on a three-dimensional image of the item sent to a client device 110 associated with the customer 204. In this example, using a controller, stylus, finger, keyboard, etc., the customer 204 may annotate the three-dimensional image of the item by marking it up with circles, arrows, etc. to reference one or more portions of the three-dimensional image of the item that help explain a reason the customer 204 is rejecting the item. In some embodiments, annotations made to a three-dimensional image of an item may be included in a rejection of an item or a portion of the item, as described below.

In some embodiments, the interface engine 328 also may send prompts to client devices 110 associated with shoppers 208 or to client devices 110 associated with customers 204. Prompts may be sent to encourage customers 204 or shoppers 208 to perform various actions. For example, the interface engine 328 may send a prompt to a client device 110 associated with a shopper 208 to capture images of an item. As an additional example, the interface engine 328 may send a prompt to a client device 110 associated with a customer 204 to accept or reject one or more portions of an item included in an order based on a three-dimensional image of the item sent to the client device 110 and/or to include items included in the order in various groups. Prompts may be generated by the prompt generation engine 330, which is further described below.

Once the interface engine 328 sends prompts to client devices 110 associated with customers 204 and/or shoppers 208, the interface engine 328 also may receive or send responses to the prompts from the client devices 110. Responses to prompts may include images of items, acceptances or rejections of items or portions of items based on three-dimensional images of the items, inputs identifying groups in which to include items included in orders, etc. If the interface engine 328 receives a response to a prompt to accept or reject an item or one or more portions of the item and the response corresponds to a rejection, the response also may include a reason for the rejection, one or more references to one or more corresponding portions of a three-dimensional image of the item, and/or a request to replace the item with a different item of the same type or of a different type. For example, if the interface engine 328 receives a response to a prompt rejecting an item corresponding to a Granny Smith apple, the response may indicate that the reason for the rejection is the presence of imperfections that are visible in the three-dimensional image of the apple (e.g., blemishes, bruises, holes, etc.). In this example, the response also may include references to the imperfections (e.g., circles around the imperfections, arrows pointing to the imperfections, etc.) and a request to collect a different Granny Smith apple or a different type of apple (e.g., a Gala apple, a Fuji apple, etc.). Alternatively, in the above example, if the interface engine 328 receives a response to the prompt accepting the apple and the interface engine 328 subsequently prompts the customer 204 to include the apple in one or more groups, the interface engine 328 also may receive a response identifying groups corresponding to a recipe in which to include the apple (e.g., apple pie) and a meal in which to include the apple (e.g., Friday night dessert). As an additional example, if the interface engine 328 receives a response to a prompt rejecting an item corresponding to tomatoes on a vine, the response may indicate that the reason for the rejection is the presence of imperfections that are visible in the three-dimensional image of the tomatoes and include references to the imperfections, in which tomatoes with the imperfections are crossed out. In this example, the response may include a request to remove the tomatoes that have been crossed out, such that they are not included among the collected tomatoes.

In various embodiments, the online concierge system 102 also includes a prompt generation engine 330. The prompt generation engine 330 may generate prompts to be sent to client devices 110 associated with shoppers 208 to capture images of items. The prompt generation engine 330 may generate a prompt to capture one or more images of an item for various reasons (e.g., if a customer 204 requests to view a three-dimensional image of the item, if the item is replacing a different item requested by the customer 204 that is unavailable, if the attribute variability engine 322 determines that one or more attributes of the item are variable, etc.). For example, if the attribute variability engine 322 determines that certain attributes of an item (e.g., color, size, weight, and ripeness) are variable or that at least a threshold number of attributes of the item are variable, the prompt generation engine 330 may generate a prompt to capture one or more images of the item, in which the prompt is to be sent to a client device 110 associated with a shopper 208 selected to fulfill an order that includes the item. As an additional example, if a customer 204 places a delivery order that includes an item, information identifying the item may be included in the order received by the order fulfillment engine 306 from a client device 110 associated with the customer 204. In this example, if the order includes a request from the customer 204 to view a three-dimensional image of the item, the prompt generation engine 330 may generate a prompt to capture one or more images of the item, in which the prompt is to be sent to a client device 110 associated with a shopper 208 selected to fulfill the order.

In some embodiments, the prompt generation engine 330 may not generate prompts to capture images of items for efficiency reasons. In such embodiments, the prompt generation engine 330 may not generate a prompt to capture images of an item if one or more images of the item have been captured and stored in the inventory database 304 and/or if a three-dimensional image of the item has been generated and stored in the image database 326. For example, if an item is a pre-packaged item that is of a standard shape, size, weight, etc., the prompt generation engine 330 may not generate a prompt to capture images of the item if images of the item that may be used to generate a three-dimensional image of the item may be retrieved from the inventory database 304. As an additional example, if images of an item were captured by a shopper 208 at a particular warehouse 210 on a given day, the prompt generation engine 330 may not generate a prompt to capture additional images of the item being collected at the same warehouse 210 later that day if the same images of the item may be used to generate a three-dimensional image of the item. Additionally, in the above example, once the three-dimensional image of the item has been generated and stored in the image database 326, the prompt generation engine 330 may not generate a prompt to capture images of the item being collected at the same warehouse 210 later that day since the three-dimensional image of the item may be retrieved from the image database 326.

In some embodiments, the prompt generation engine 330 also may generate prompts to be sent to client devices 110 associated with customers 204. In such embodiments, the prompt generation engine 330 may generate a prompt to accept or reject one or more portions of an item based on a three-dimensional image of the item or to include the item in one or more groups. For example, once the interface engine 328 sends a three-dimensional image of an item to a client device 110 associated with a customer 204, the prompt generation engine 330 also may generate a prompt to be sent to the client device 110 to accept or reject one or more portions of the item based on the three-dimensional image of the item. In this example, if the customer 204 accepts the item, the prompt generation engine 330 also may generate a prompt to be sent to the client device 110 associated with the customer 204 to include the item in one or more groups (e.g., meals, recipes, etc.).

In some embodiments, the online concierge system 102 also includes an item grouping engine 332. The item grouping engine 332 may include an item in one or more groups of items based on an input received from a client device 110 associated with a customer 204 of the online concierge system 102 to include the item in the group(s). The item grouping engine 332 also may remove an item from a group or move an item to a different group based on an input received from a client device 110 associated with a customer 204. A group may correspond to a recipe, a meal, a day, an event, or any other type of group that may be associated with items included among the inventory of a warehouse 210. For example, if an item corresponds to a loaf of sliced bread, the item may be included in groups corresponding to multiple meals for a given week that would include one or more slices of the bread. Each group of items may be associated with a name corresponding to a recipe (e.g., "avocado toast," "ham and cheese sandwich," etc.), a meal (e.g., "breakfast," "lunch," "dinner," "snack," etc.), a day of the week (e.g., "Sunday," "Monday," etc.), an event (e.g., picnic), etc. In some embodiments, a name associated with a group may be included in an input received from a client device 110 associated with a customer 204.

In various embodiments, the item grouping engine 332 is configured to store information identifying one or more items included in one or more groups in the item group database 334. Information identifying each group of items may be stored in the item group database 334 in association with information identifying the items included in the group, information identifying an order in which the item/group is included, information identifying a customer 204 associated with the order, a date/time that the order was placed, information identifying a warehouse 210 at which the order was fulfilled, etc. In embodiments in which a three-dimensional image of an item included in a group was generated by the image generation engine 324, information associated with the three-dimensional image also may be stored in association with information identifying the group. For example, information that may be used to retrieve three-dimensional images of items from the image database 326 may be stored in association with information identifying one or more groups in which the items are included.

In some embodiments, the online concierge system 102 also includes a preference update engine 336. The preference update engine 336 may update information stored in the customer database 314 describing preferences of customers 204 for items or dislikes of the customers 204 for items based on information received from client devices 110 associated with the customers 204. For example, the preference update engine 336 may update information describing a preference of a customer 204 for an item based on information received from a client device 110 associated with the customer 204 via the preferences management interface 406 of the CMA 206, which is described below. As an additional example, the preference update engine 336 may update information describing a preference of a customer 204 for an item based on previous order information associated with the customer 204 stored in the transaction records database 308 and/or the training dataset 320, in which the previous orders include the item.

In various embodiments, the preference update engine 336 may update a preference/dislike of a customer 204 for an item based on a response to a prompt to accept or reject an item or one or more portions of the item received from a client device 110 associated with the customer 204. For example, suppose that the interface engine 328 receives a response from a client device 110 associated with a customer 204 corresponding to a rejection of an item, in which the response includes a reason for the rejection, a reference to a corresponding portion of a three-dimensional image of the item, and a request to replace the item with a different item of the same type. In this example, if the item is a banana and a reason for the rejection included in the response is that the banana is too ripe and the response includes arrows referencing brown spots on the banana, the interface engine 328 subsequently may send a three-dimensional image of a replacement banana that is mostly yellow with some green that does not have any brown spots. In the above example, if the interface engine 328 receives a response from the client device 110 associated with the customer 204 accepting the replacement banana, the preference update engine 336 may update a preference for bananas associated with the customer 204 stored in the customer database 314 indicating the customer 204 prefers bananas that are mostly yellow with some green to bananas with brown spots. Alternatively, in the above example, if the reason for the rejection included in the response is that the customer 204 ordered one unit of bananas and wanted a bunch of bananas rather than a single banana, the preference update engine 336 may update a preference for bananas associated with the customer 204 stored in the customer database 314 indicating that the customer 204 prefers a bunch of bananas to a single banana when ordering one unit of bananas.

Customer Mobile Application

Figure 4A:
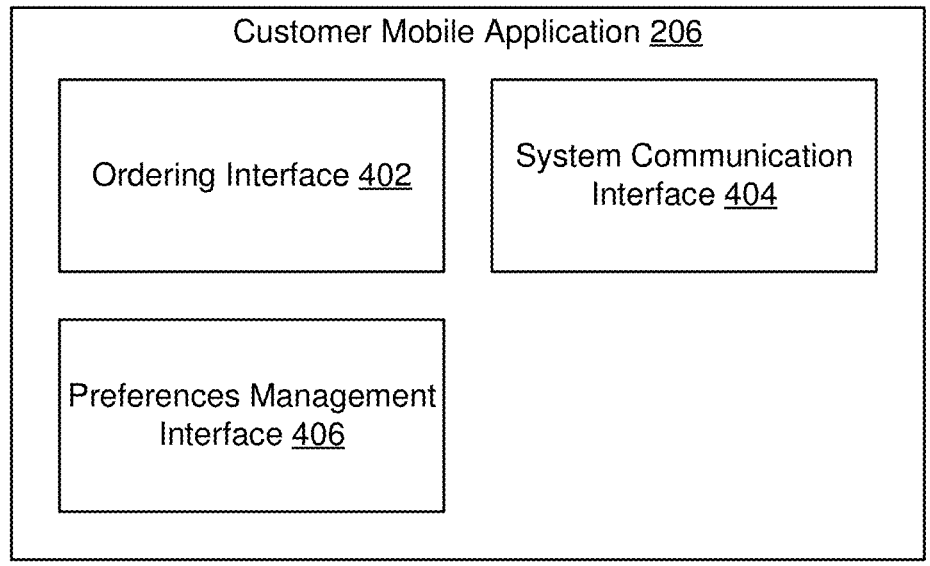
FIG. 4A is a diagram of a customer mobile application (CMA), according to one or more embodiments.

FIG. 4A is a diagram of the customer mobile application (CMA) 206, according to one or more embodiments. The CMA 206 includes an ordering interface 402, which provides an interactive interface which a customer 204 may use to browse through and select products and place an order. The CMA 206 also includes a system communication interface 404 which, among other functions, receives inventory information from the online shopping concierge system 102 and transmits order information to the system 102. In some embodiments, prompts may be sent to the CMA 206 and presented to a customer 204 via the system communication interface 404. The CMA 206 also includes a preferences management interface 406 which allows a customer 204 to manage basic information associated with his/her account, such as his/her home address and payment instruments. The preferences management interface 406 may also allow a customer 204 to manage other details such as his/her favorite or preferred warehouses 210, preferred delivery times, special instructions for delivery, and so on.

Shopper Mobile Application

Figure 4B:
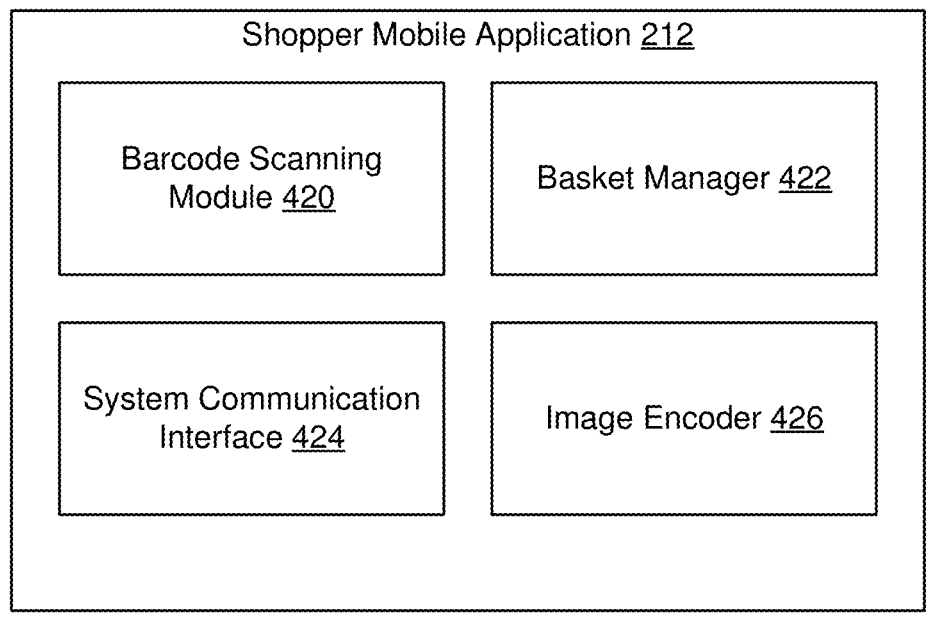
FIG. 4B is a diagram of a shopper mobile application (SMA), according to one or more embodiments.

FIG. 4B is a diagram of the shopper mobile application (SMA) 212, according to one or more embodiments. The SMA 212 includes a barcode scanning module 420, which allows a shopper 208 to scan an item at a warehouse 210 (such as a can of soup on the shelf at a grocery store). The barcode scanning module 420 may also include an interface, which allows a shopper 208 to manually enter information describing an item (such as its serial number, SKU, quantity and/or weight) if a barcode is not available to be scanned. The SMA 212 also includes a basket manager 422, which maintains a running record of items collected by a shopper 208 for purchase at a warehouse 210. This running record of items is commonly known as a "basket." In one embodiment, the barcode scanning module 420 transmits information describing each item (such as its cost, quantity, weight, etc.) to the basket manager 422, which updates its basket accordingly. The SMA 212 also includes a system communication interface 424, which interacts with the online concierge system 102. For example, the system communication interface 424 receives an order from the online concierge system 102 and transmits the contents of a basket of items to the online concierge system 102. Similar to the CMA 206, in some embodiments, prompts may be sent to the SMA 212 and presented to a shopper 208 via the system communication interface 424. The SMA 212 also includes an image encoder 426 which encodes the contents of a basket into an image. For example, the image encoder 426 may encode a basket of goods (with an identification of each item) into a QR code, which may then be scanned by an employee of a warehouse 210 at check-out.

Figure 5:
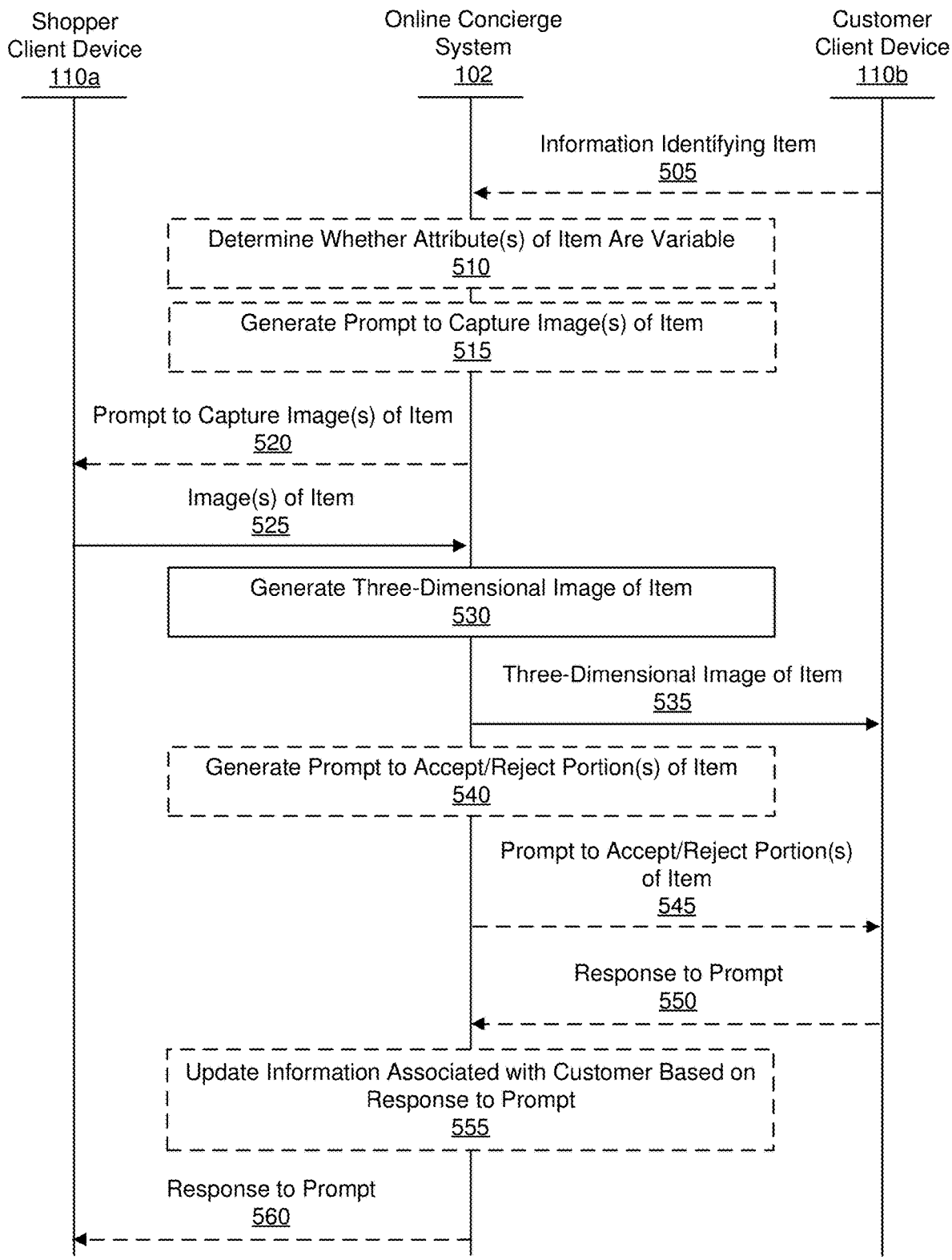
FIG. 5 is an interaction diagram of a method for displaying a three-dimensional image of an item to a customer of an online concierge system during order fulfillment, according to one or more embodiments.

Displaying a Three-Dimensional Image of an Item to a Customer of an Online Concierge System During Order Fulfillment FIG. 5 is an interaction diagram of a method for displaying a three-dimensional image of an item to a customer 204 of an online concierge system 102 during order fulfillment, according to one or more embodiments. In various embodiments, the method includes different or additional steps than those described in conjunction with FIG. 5. Further, in some embodiments, the steps of the method may be performed in different orders than the order described in conjunction with FIG. 5. The method described in conjunction with FIG. 5 may be carried out by the online concierge system 102 in various embodiments, while in other embodiments, the steps of the method are performed by any online system capable of retrieving items.

In some embodiments, the online concierge system 102 receives 505 (e.g., via the order fulfillment engine 306) information identifying an item from a client device 110b associated with a customer 204 of the online concierge system 102, in which the item is included among the inventory of a warehouse 210 associated with a retailer. The client device 110b associated with the customer 204 may be any device that includes a display area, such as a mobile device (e.g., a smartphone or a tablet), a laptop or a desktop computer, a virtual reality device, an augmented reality device, etc. To illustrate an example, if the customer 204 places a delivery order that includes the item, information identifying the item may be included in the order received 505 from the client device 110b associated with the customer 204. As an additional example, information identifying the item may be included in a request received 505 by the online concierge system 102 from the client device 110b associated with the customer 204 to view additional information associated with the item while browsing items in a web-based marketplace provided by the online concierge system 102. In some embodiments, the information identifying the item received 505 by the online concierge system 102 may include a request to view a three-dimensional image of the item. In either of the above examples, the order received 505 by the online concierge system 102 from the client device 110b associated with the customer 204 may include a request to view a three-dimensional image of the item.

In various embodiments, the online concierge system 102 determines 510 (e.g., using the attribute variability engine 322) whether one or more attributes of the item are variable based in part on the information identifying the item. In some embodiments, attributes of the item that are variable include a shape of the item (e.g., round, oval, irregular, etc.), a dimension of the item (e.g., length, height, diameter, etc.), a quantity of the item (e.g., number, volume, or weight of the item), a quality of the item (e.g., freshness, ripeness, number of imperfections, etc.), a color of the item, etc. In various embodiments, the online concierge system 102 determines 510 whether one or more attributes of the item are variable based on information stored in the online concierge system 102 (e.g., in the inventory database 304). For example, the online concierge system 102 may access stored information (e.g., in the inventory database 304) and determine 510 whether the information includes multiple values or ranges of values describing qualitative or quantitative information about the item, such as its size, color, or weight.

In various embodiments, attributes of the item may be identified by a taxonomy maintained by the online concierge system 102 (e.g., by the inventory management engine 302). In such embodiments, the online concierge system 102 may access the taxonomy and determine 510 whether one or more attributes associated with a category in which the item is included are variable. For example, if the item is a watermelon, a category associated with the item may indicate that it is a produce item and attributes associated with the category indicate that different watermelons may vary in shape, color, freshness, ripeness, size, number of imperfections, and weight. In this example, the online concierge system 102 may determine 510 that one or more attributes of the item are therefore variable. As an additional example, if the item is a box of cereal, a category associated with the item may indicate that it is a pre-packaged item and attributes associated with the category indicate that all boxes of the cereal should therefore be of a standard shape, size, weight, etc. In this example, the online concierge system 102 may determine 510 that one or more attributes of the item are therefore not variable.

In some embodiments, the online concierge system 102 may generate 515 (e.g., using the prompt generation engine 330) a prompt to capture one or more images of the item, in which the prompt is to be sent to a client device 110a associated with a shopper 208 associated with the online concierge system 102 (e.g., a shopper 208 selected to fulfill a delivery order placed by the customer 204). The online concierge system 102 may generate 515 the prompt to capture the image(s) of the item for various reasons (e.g., if the customer 204 requested to view a three-dimensional image of the item, if the item is replacing a different item requested by the customer 204 that is unavailable, if the online concierge system 102 determines 510 that one or more attributes of the item are variable, etc.). For example, if the online concierge system 102 determines 510 that certain attributes of the item (e.g., color, size, weight, and ripeness) are variable or that at least a threshold number of attributes of the item are variable, the online concierge system 102 may generate 515 the prompt to capture one or more images of the item, in which the prompt is to be sent to the client device 110a associated with the shopper 208. As an additional example, if the customer 204 placed a delivery order that includes the item, information identifying the item may be included in the order received 505 by the online concierge system 102 from the client device 110b associated with the customer 204. In this example, if the order includes a request from the customer 204 to view a three-dimensional image of the item, the online concierge system 102 may generate 515 the prompt to capture one or more images of the item, in which the prompt is to be sent to the client device 110a associated with the shopper 208.

In some embodiments, the online concierge system 102 may not generate 515 the prompt to capture one or more images of the item for efficiency reasons. In such embodiments, the online concierge system 102 may not generate 515 the prompt if one or more images of the item have been captured and stored (e.g., in the inventory database 304) and/or if a three-dimensional image of the item has been generated 530 and stored (e.g., in the image database 326). For example, if the item is a pre-packaged item that is of a standard shape, size, weight, etc., the online concierge system 102 may not generate 515 the prompt to capture images of the item if images of the item that may be used to generate 530 a three-dimensional image of the item may be retrieved (e.g., from the inventory database 304). As an additional example, if images of the item were captured by the same or a different shopper 208 at the same warehouse 210 earlier that same day, the online concierge system 102 may not generate 515 the prompt to capture additional images of the item if the same images of the item may be used to generate 530 a three-dimensional image of the item. Additionally, in the above example, once the three-dimensional image of the item has been generated 530 and stored (e.g., in the image database 326), the online concierge system 102 may not generate 515 the prompt to capture images of the item since the three-dimensional image of the item may be retrieved (e.g., from the image database 326).

In embodiments in which the online concierge system 102 generates 515 the prompt to capture one or more images of the item, the online concierge system 102 may send 520

(e.g., using the interface engine 328) the prompt to the client device 110a associated with the shopper 208. The client device 110a may be a mobile device, such as a smartphone or a tablet, or any device capable of capturing images or receiving images captured by another device. For example, if the client device 110a associated with the shopper 208 is a mobile device, the prompt may be sent 520 to the client device 110a associated with the shopper 208 via the SMA 212 and presented to the shopper 208 via the system communication interface 424. The prompt may be sent 520 to the client device 110a associated with the shopper 208 to encourage the shopper 208 to capture the image(s) of the item.

Figure 6B:
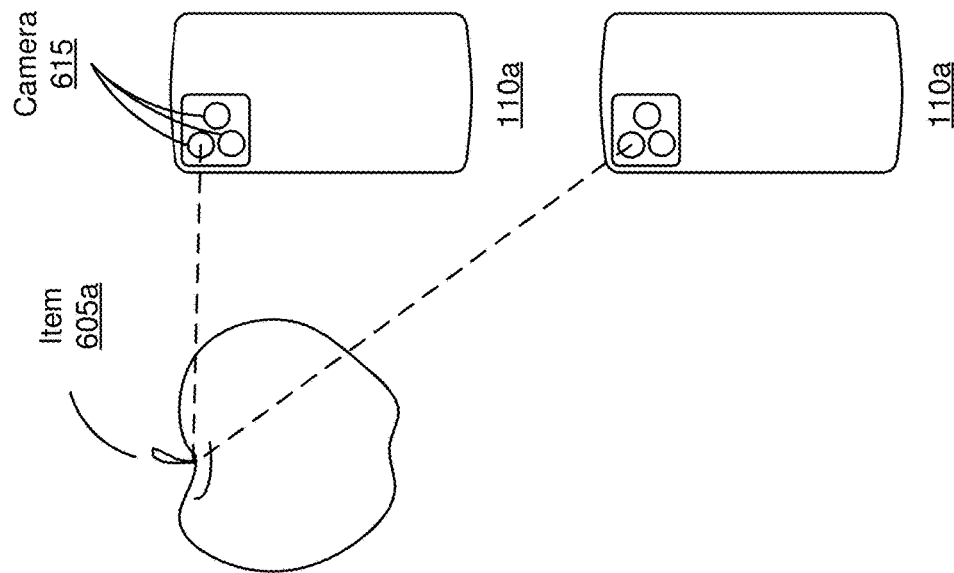
FIG. 6B illustrates a method for capturing multiple images of an item using a client device associated with a shopper associated with an online concierge system, according to one or more embodiments.
Figure 6A:
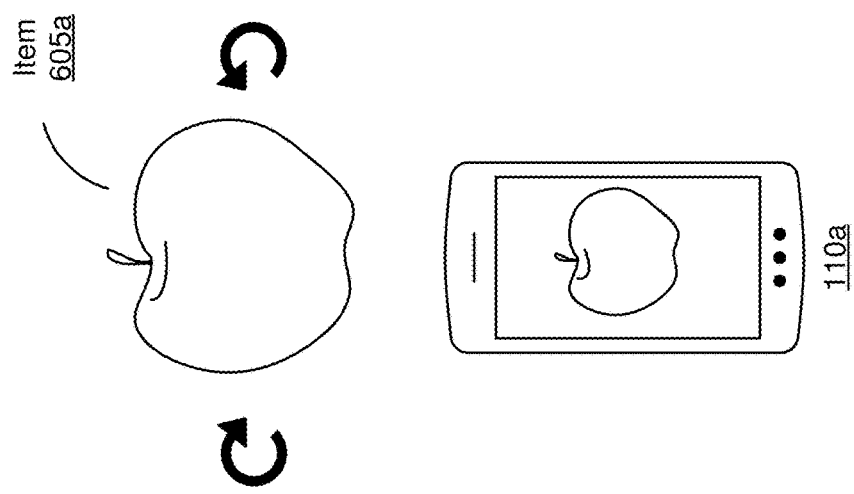
FIG. 6A illustrates a method for capturing multiple images of an item using a client device associated with a shopper associated with an online concierge system, according to one or more embodiments.

The online concierge system 102 then receives 525 (e.g., using the interface engine 328) one or more images of the item from the client device 110a associated with the shopper 208. In embodiments in which the online concierge system 102 sends 520 the prompt to the client device 110a associated with the shopper 208, the image(s) of the item received 525 by the online concierge system 102 may be included in a response to the prompt. In embodiments in which the online concierge system 102 receives (step 525) multiple images of the item, each of the images of the item is captured from a different position (e.g., a different height relative to the ground or the item) and/or a different angle (e.g., a different angle relative to the ground or the item). For example, as shown in FIG. 6A, which illustrates a method for capturing multiple images of an item 605a using a client device 110a associated with a shopper 208 associated with an online concierge system 102, according to one or more embodiments, multiple images of the item 605a may be captured by one or more cameras on the client device 110a by rotating the item 605a clockwise and/or counterclockwise about one or more axes as the images are captured. Alternatively, as shown in FIG. 6B, which also illustrates a method for capturing multiple images of an item 605a using a client device 110a associated with a shopper 208 associated with an online concierge system 102, according to one or more embodiments, multiple images of the item 605a may be captured by one or more cameras 615 on the client device 110a, in which the client device 110a is moved around the item 605a clockwise and/or counterclockwise about one or more axes as the images are captured. Furthermore, in some embodiments, at least some of the images may overlap with each other. For example, if the item 605 is a carton of eggs, at least some images of the carton may overlap with each other, such that the same portion of the carton is depicted from different positions and/or angles. In various embodiments, the images of the item 605 may be included in a video of the item 605. For example, the images of the item 605 may correspond to different frames of a video of the item 605 captured by a camera 615 as the camera 615 is moved around the item 605.

Although not illustrated in FIG. 5, in some embodiments, the images of the item 605 are not received 525 from a client device 110a associated with the shopper 208. Rather, in such embodiments, the images of the item 605 may be received 525 from the warehouse 210 and/or stored by the online concierge system 102 (e.g., in the inventory database 304) for retrieval at a later time. For example, the online concierge system 102 may access and retrieve the images from a database stored in the online concierge system 102 (e.g., in the inventory database 304), in which the images are included in an item catalog received 525 from a warehouse 210 identifying items 605 offered for purchase by the warehouse 210. In the above example, the images may be stored in association with various types of information (e.g., information identifying the item 605 and the warehouse 210, a date that the catalog was received, etc.).

Figure 6C:
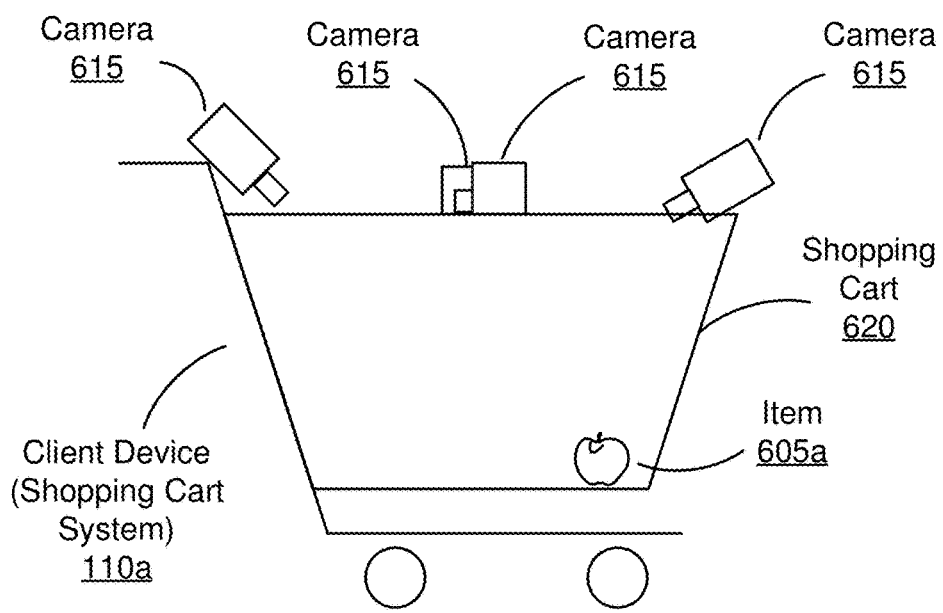
FIG. 6C illustrates a method for capturing multiple images of an item using a client device associated with a shopper associated with an online concierge system, according to one or more embodiments.
Figure 6D:
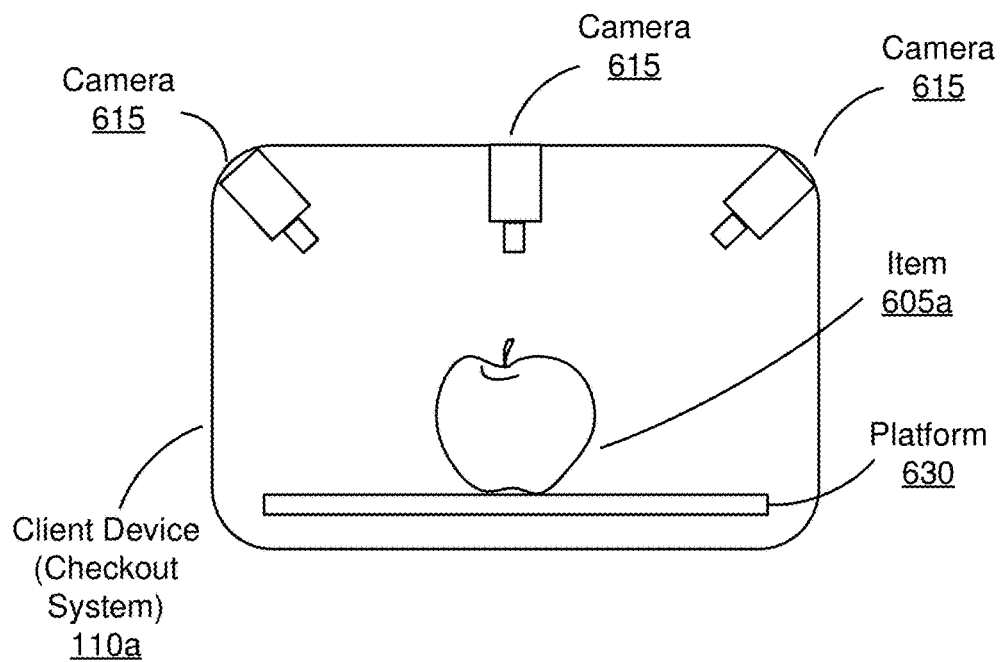
FIG. 6D illustrates a method for capturing multiple images of an item using a client device associated with a shopper associated with an online concierge system, according to one or more embodiments.

The images of the item 605 may be captured by one or more devices within the warehouse 210. Examples of devices that may be used to capture the images of the item 605 include a camera 615 or a client device 110 (e.g., a shopping cart system, an inventory management system, an order fulfillment system, a checkout system, a mobile device, etc.) associated with the shopper 208. For example, the client device 110a associated with the shopper 208, such as the smartphone shown in FIG. 6B, may include multiple cameras 615 that are clustered on the back of the client device 110a, which may be used by the shopper 208 to capture images of the item 605 simultaneously from slightly different angles and/or positions. A camera 615 used to capture an image of the item 605 may have various functionalities (e.g., infrared, image stabilization, etc.). In the above example, one or more of the cameras 615 of the client device 110a also may be infrared cameras 615, which provide additional depth perception information about the item 605. An additional example is shown in FIG. 6C, which illustrates a method for capturing multiple images of an item 605 using a client device 110a associated with a shopper 208 associated with an online concierge system 102, according to one or more embodiments. In this example, the client device 110a associated with the shopper 208, such as a shopping cart system, may include multiple cameras 615 mounted along the perimeter of a shopping cart 620 that capture images of the item 605a from different angles as the item 605a is added to the shopping cart 620. As an additional example, if the warehouse 210 is a non-public warehouse 210 that stores items 605 that may be collected and delivered to customers 204, images of the item 605 may be captured by an inventory management system that keeps track of each item 605 included in the inventory. In this example, the inventory management system may include one or more cameras 615 that capture images of the item 605 from different angles as it is added to the inventory of the warehouse 210. As yet another example, an order fulfillment system, such as an autonomous device (e.g., a robot) that collects items 605 included in an order, may include one or more cameras 615 that capture images of the item 605 from different angles as it is collected at the warehouse 210. An additional example is shown in FIG. 6D, which illustrates a method for capturing multiple images of an item 605 using a client device 110a associated with a shopper 208 associated with an online concierge system 102, according to one or more embodiments. In this example, the client device 110a associated with the shopper 208, such as a checkout system, may include a platform 630 on which items 605 to be purchased are set. In this example, multiple cameras 615 that surround the platform 630 capture images of the item 605 from different angles and/or positions during a checkout process to identify the item 605.

Referring back to FIG. 5, the online concierge system 102 then generates 530 (e.g., using the image generation engine 324) a three-dimensional image of the item 605 based in part on the image(s) of the item 605. The three-dimensional image of the item 605 includes one or more visual aspects of the item 605, such as one or more dimensions of the item 605, one or more edges, angles, surfaces, and/or contours of the item 605, one or more colors of the item 605, text included on the item 605, images included on the item 605, or any other suitable visual aspects of the item 605. For example, if the item 605 is a physical cereal box, the online concierge system 102 may generate 530 the three-dimensional image of the cereal box that has multiple flat surfaces connected at right angles, in which the surfaces have dimensions (i.e., a length, a height, and a width) corresponding to those of the physical cereal box. In the above example, the three-dimensional image of the cereal box also may include colors, text, images, etc. that are included on the physical cereal box (e.g., the name of the cereal, the manufacturer's logo, nutritional information, ingredients, an image of a bowl of the cereal, etc.), such that the three-dimensional image of the cereal box appears identical to the physical cereal box when viewed from the same angles and/or positions.

In various embodiments, the online concierge system 102 may generate 530 the three-dimensional image of the item 605 based in part on information associated with a device used to capture the image(s) of the item 605. In such embodiments, information associated with the device may include information associated with one or more cameras 615 included on the device. For example, the online concierge system 102 may generate 530 the three-dimensional image of the item 605 based on multiple overlapping images of the item 605, information describing a position and/or an angle of a camera 615 of a client device 110a associated with the shopper 208 used to capture each image, and information describing characteristics of the camera 615 (e.g., focal length, pixel size, lens distortion, etc.). In embodiments in which one or more devices used to capture the image(s) of the item 605 are included in the warehouse 210, the online concierge system 102 may receive information associated with the device(s) from an entity associated with the warehouse 210 (e.g., the retailer). For example, if images of the item 605 are captured by cameras 615 included on one or more devices, such as a shopping cart system, an order fulfillment system, an inventory management system, and/or a checkout system at the warehouse 210 associated with the retailer, the online concierge system 102 may generate 530 the three-dimensional image of the item 605 based on the images and information associated with the device(s) received from the retailer. Information associated with a device used to capture the image(s) of the item 605 also or alternatively may be received from the device. For example, if images of the item 605 are captured by cameras 615 included on a smartphone associated with the shopper 208, metadata associated with the smartphone, such as characteristics of the cameras 615 (e.g., focal length, pixel size, lens distortion, etc.), may be received from the smartphone (e.g., via the SMA 212) and used to generate 530 the three-dimensional image of the item 605.

In some embodiments, the image(s) of the item 605 used by the online concierge system 102 to generate 530 the three-dimensional image of the item 605 may be enhanced. An image may be enhanced using various techniques, including color correction, noise removal, etc. In some embodiments, an image may be enhanced by the online concierge system 102. Furthermore, in some embodiments, the online concierge system 102 may select the highest quality images of the item 605 based on various characteristics of each image (e.g., image resolution, size, noise, etc.) and generate 530 the three-dimensional image of the item 605 based on the selected images. For example, the online concierge system 102 may receive (step 525) images of the item 605 captured by the client device 110a associated with the shopper 208 using a photo studio application associated with the online concierge system 102. In this example, the online concierge system 102 may then enhance the images by sharpening them, adjusting their brightness, etc. and use the highest quality images of the item 605 to generate 530 the three-dimensional image of the item 605. In various embodiments, the image(s) also or alternatively may be processed by an application or tool that automatically enhances images. For example, an image of the item 605 may be captured using an application or tool that performs white balancing by adjusting colors of the image to match the color of the light source so that white objects in the image appear white.

In various embodiments, the three-dimensional image of the item 605 is generated 530 by the online concierge system 102 based in part on one or more reference dimensions included in one or more of the images of the item 605. Reference dimensions may correspond to known or specified dimensions (e.g., lengths, heights, widths, diameters, etc.). For example, a length indicated by a ruler included in an image of the item 605 may serve as a reference dimension. As an additional example, suppose that the item 605a is placed in a shopping cart 620, such as the one shown in FIG. 6C, in which a length of the shopping cart 620 is known. In this example, if an image of the interior of the shopping cart 620 is captured from end-to-end with the item 605a in the shopping cart 620, the length of the shopping cart 620 may serve as a reference dimension. As yet another example, suppose that the item 605a is placed on a round platform 630 of the checkout system shown in FIG. 6D, in which a diameter of the platform 630 is known. In this example, if an image of the item 605a on the platform 630 is captured, the diameter of the platform 630 may serve as a reference dimension.

In various embodiments, the three-dimensional image of the item 605 is generated 530 by the online concierge system 102 based in part on one or more reference colors included in the image(s) of the item 605. Reference colors may correspond to known or specified colors identified by a color scheme such as the red/green/blue (RGB) scheme. For example, if RGB values of a color included in a color palette captured in an image of the item 605 are known, the color may serve as a reference color. As an additional example, if the item 605 is an apple and an image of the apple next to a cereal box is captured, in which RGB values of colors of the cereal box are known, each of the colors of the cereal box may serve as a reference color.

The online concierge system 102 may generate 530 the three-dimensional image of the item 605 using photogrammetry, laser scanning, infrared (IR) thermography, or any other suitable technique or combination of techniques. In embodiments in which the online concierge system 102 generates 530 the three-dimensional image of the item 605 using photogrammetry, one or more images of the item 605 used by the online concierge system 102 to generate 530 the three-dimensional image may overlap with each other and be taken at different positions and/or angles. Furthermore, in such embodiments, the online concierge system 102 may perform various steps to generate 530 the three-dimensional image (e.g., three-dimensional mesh generation, image matching, feature extraction, triangulation, etc.). For example, as shown in FIG. 6B, using photogrammetry, the online concierge system 102 may generate 530 the three-dimensional image of the item 605 by computing the position of a point on the item 605 in three-dimensional space using multiple images of the item 605 captured at different positions and/or angles. In various embodiments, the online concierge system 102 may generate 530 the three-dimensional image of the item 605 based on a single image of the item 605. In such embodiments, the online concierge system 102 may do so based on additional information included in the image. For example, if an image of the item 605 includes a reference dimension, the online concierge system 102 may determine one or more dimensions of the item 605 and use photogrammetric techniques to generate 530 the three-dimensional image of the item 605 based on the image and the dimension(s).

Although not illustrated in FIG. 5, in various embodiments, the online concierge system 102 is configured to store the three-dimensional image of the item 605 (e.g., in the image database 326). In such embodiments, the three-dimensional image of the item 605 may be stored in association with various types of information associated with the three-dimensional image. For example, the three-dimensional image of the item 605 may be stored in association with information identifying the item 605 (e.g., an item identifier, a SKU, serial number, etc.), a date and/or time it was generated 530, information identifying a warehouse 210 at which images of the item 605 used to generate 530 the three-dimensional image were captured, and information describing one or more devices used to capture the images.

Referring back to FIG. 5, once the online concierge system 102 generates 530 the three-dimensional image of the item 605, it sends 535 the three-dimensional image of the item 605 to the client device 110b associated with the customer 204 (e.g., via the CMA 206). As described above, the client device 110b associated with the customer 204 may be a mobile device (e.g., a smartphone or a tablet), a laptop or a desktop computer, a virtual reality device, an augmented reality device, or any other device that includes a display area. For example, if the online concierge system 102 sends 535 the three-dimensional image of the item 605 to the client device 110b associated with the customer 204, in which the client device 110b is a virtual reality device or an augmented reality device, the three-dimensional image of the item 605 is rendered in a virtual reality environment or an augmented reality environment, respectively.

Figure 7A:
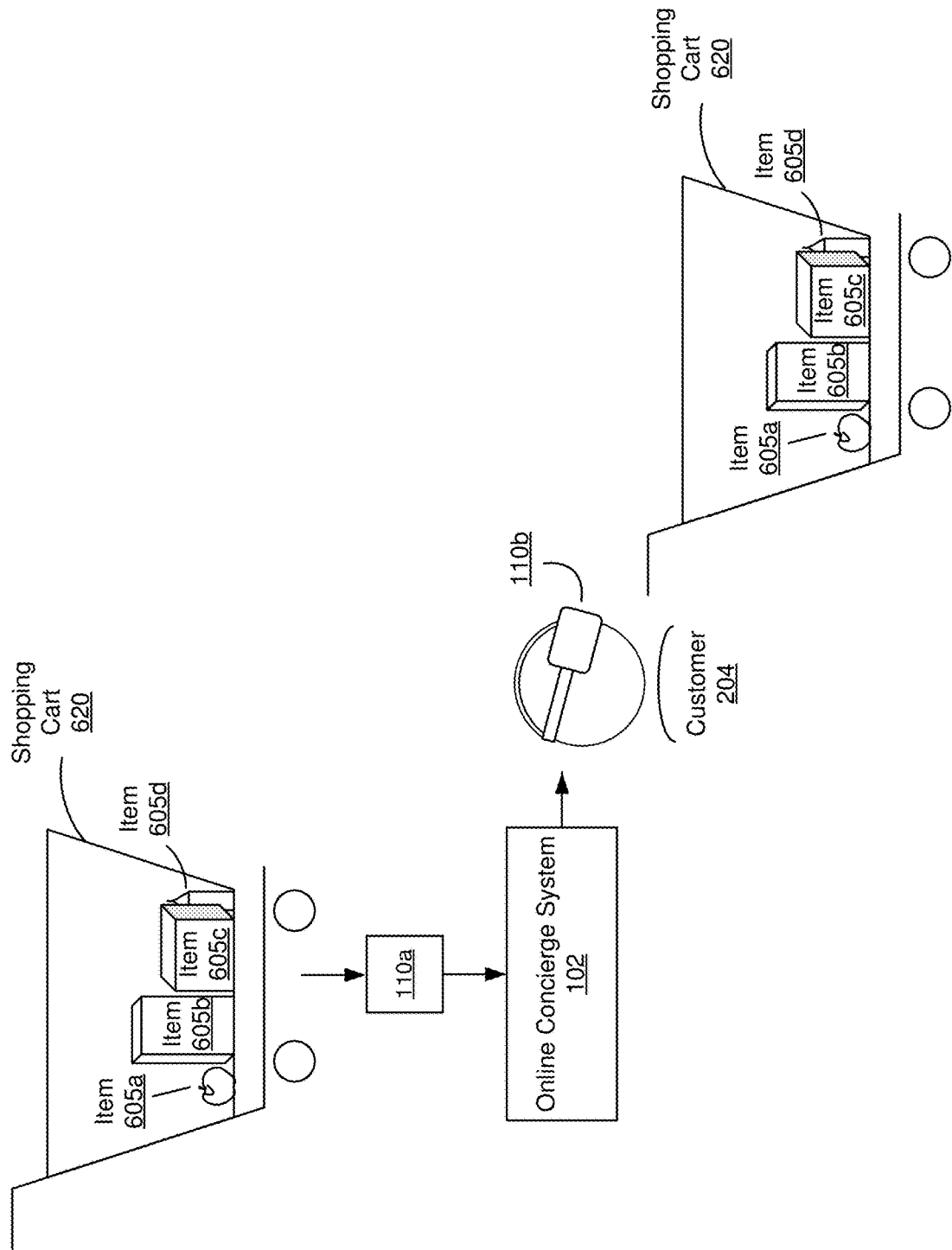
FIG. 7A illustrates renderings of three-dimensional images of items in a virtual reality environment within a display area of a client device, according to one or more embodiments.
Figure 7B:
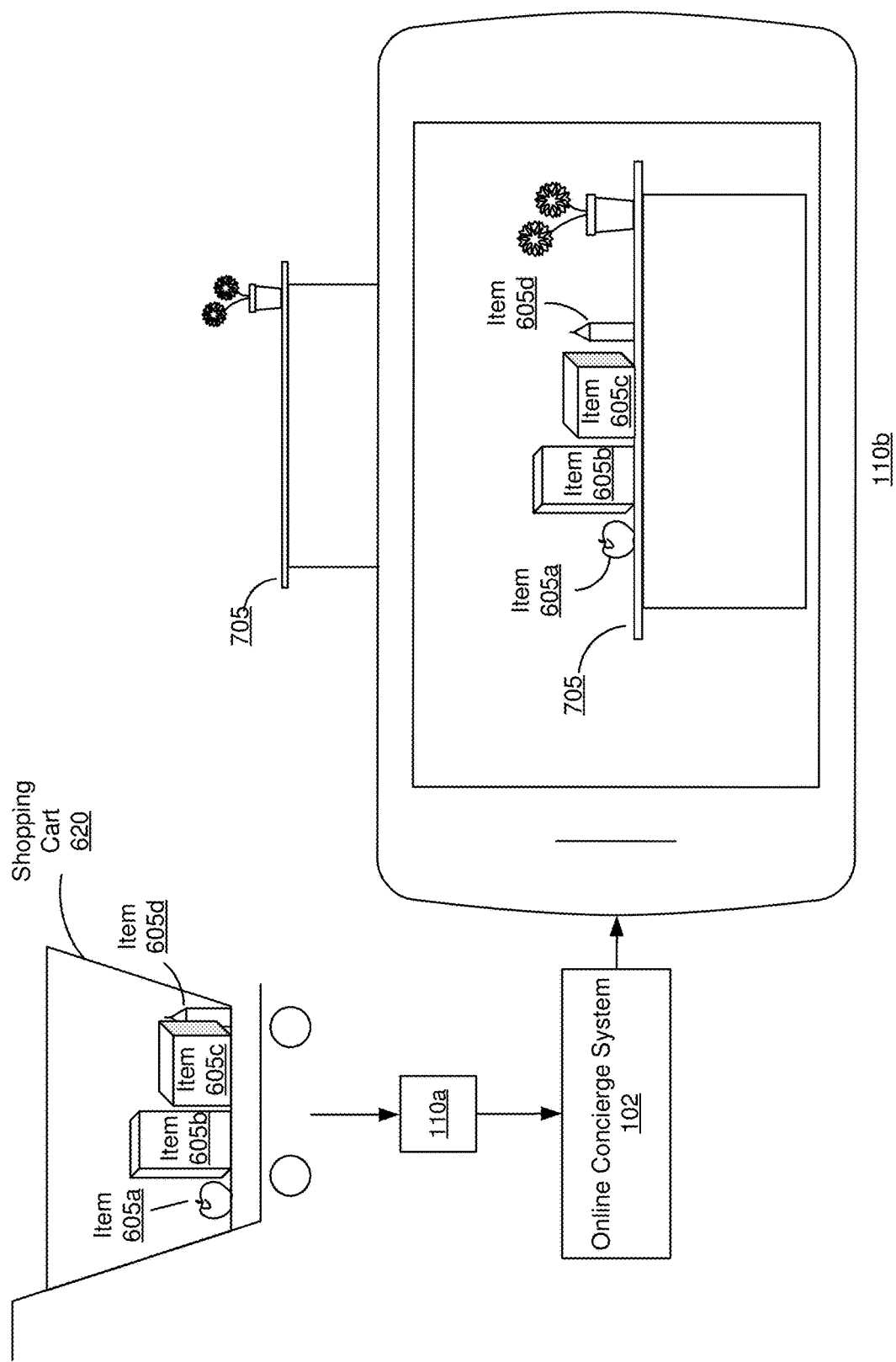
FIG. 7B illustrates renderings of three-dimensional images of items in an augmented reality environment within a display area of a client device, according to one or more embodiments.
Figure 7C:
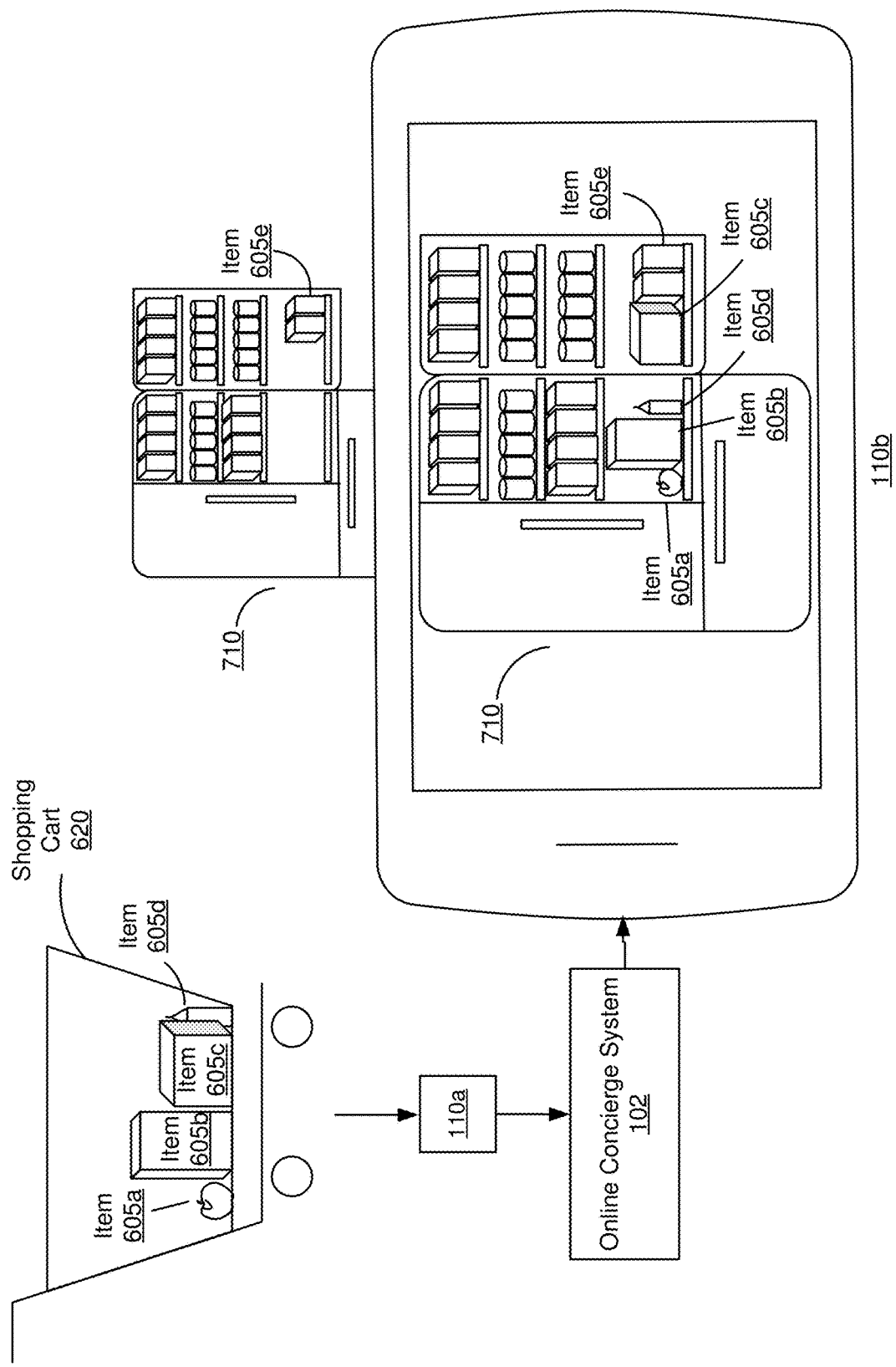
FIG. 7C illustrates renderings of three-dimensional images of items in an augmented reality environment within a display area of a client device, according to one or more embodiments.

In some embodiments, the three-dimensional image of the item 605 may be included among three-dimensional images of multiple items 605 sent 535 to the client device 110b (e.g., to allow the customer 204 to view the contents of their entire order and quickly identify any issues with the items 605). In such embodiments, the three-dimensional image of the item 605 may be included among three-dimensional images of items 605 included in the same order (e.g., in a three-dimensional image of a shopping cart 620 or shopping basket used to hold the items 605), one or more groups of three-dimensional images of items 605 included in the same order, etc. For example, as shown in FIG. 7A, which illustrates renderings of three-dimensional images of items 605 in a virtual reality environment within a display area of a client device 110b, according to one or more embodiments, suppose that the online concierge system 102 sends 535 the three-dimensional image of the item 605 to the client device 110b associated with the customer 204, in which the client device 110b is a virtual reality device. In this example, the three-dimensional image of the item 605a may be presented in a three-dimensional shopping cart 620, along with three-dimensional images of other items 605b-d included in the same order. As an additional example, as shown in FIGS. 7B and 7C, which both illustrate renderings of three-dimensional images of items 605 in an augmented reality environment within a display area of a client device 110b, according to one or more embodiments, suppose that the client device 110b is an augmented reality device. In this example, the three-dimensional image of the item 605a may be presented along with the three-dimensional images of other items 605b-d included in the same order on various surfaces, such as a kitchen counter 705, as shown in FIG. 7B, or shelves of a refrigerator 710, as shown in FIG. 7C, when the surfaces are presented in a display area of the client device 110b.

In embodiments in which the three-dimensional image of the item 605 is rendered in an augmented reality environment, the three-dimensional image of the item 605 may be scaled by the online concierge system 102 based on one or more additional items 605 identified within the display area of the client device 110b associated with the customer 204. In such embodiments, the online concierge system 102 may detect each additional item 605 within the display area, identify the item 605, and scale the three-dimensional image of the item 605 based on one or more known dimensions of the identified item 605. For example, as shown in FIG. 7C, suppose that the online concierge system 102 sends 535 the three-dimensional image of the item 605a to the client device 110b associated with the customer 204, in which the client device 110b is an augmented reality device and the item 605a is an apple, such that the three-dimensional image of the apple is rendered so it appears on a shelf of a refrigerator 710 that is presented in a display area of the client device 110b. In this example, if an additional item 605e, such as a box of juice, is detected within the display area of the client device 110b, the online concierge system 102 may access information it maintains (e.g., in the inventory database 304) and identify the additional item 605e as the box of juice if it has at least a threshold measure of similarity to one or more images of the box of juice included in an item catalog. In the above example, the online concierge system 102 also or alternatively may access information it maintains (e.g., in the image database 326) and identify the additional item 605e as the box of juice if it has at least a threshold measure of similarity to a three-dimensional image of the box of juice previously generated 530 by the online concierge system 102. In this example, the online concierge system 102 may then scale the three-dimensional image of the apple based on one or more known dimensions of the box of juice, such that the size of the apple is accurately represented based on the size of the box of juice.

The perspective of the three-dimensional image of the item 605 that is sent 535 to the client device 110b may be modifiable within the display area of the client device 110b (e.g., so that different views of the item 605, such as plan views, elevation views, orthographic views, etc. are displayed within the display area of the client device 110b). The perspective of the three-dimensional image of the item 605 may be modified by rotating the three-dimensional image about one or more axes, by changing a viewing angle along one or more axes, and/or by changing a viewing position relative to the three-dimensional image of the item 605. For example, if the three-dimensional image of the item 605 is sent 535 to the client device 110b and the client device 110b is a smartphone or a tablet, a perspective of the three-dimensional image of the item 605 may be modified within a display area of the client device 110b by rotating the three-dimensional image of the item 605 about one or more axes (e.g., by swiping across a display area of the client device 110b, tapping on one or more buttons included in the display area, etc.). In the above example, the perspective of the three-dimensional image of the item 605 also may be modified by zooming in or zooming out (e.g., by stretching two fingers apart or pinching two fingers together on the display area). As an additional example, if the three-dimensional image of the item 605 is sent 535 to the client device 110b and the client device 110b is a virtual reality device or an augmented reality device, the perspective of the three-dimensional image may be modified within the display area (e.g., a headset) of the client device 110b by using one or more controllers, haptic gloves, etc. to pick up, move, and rotate the item 605. In the above example, the perspective of the three-dimensional image of the item 605 also or alternatively may be modified by pivoting the display area of the client device 110b to change a viewing angle along one or more axes and/or by moving a position of the display area to change a viewing position relative to the three-dimensional image of the item 605.

In some embodiments, the three-dimensional image of the item 605 that is sent 535 to the client device 110b associated with the customer 204 may be annotated. The three-dimensional image of the item 605 may be annotated with comments, markups, etc. that reference one or more portions of the three-dimensional image of the item 605. For example, using a controller, stylus, finger, keyboard, etc., the customer 204 may annotate the three-dimensional image of the item 605 by marking it up with circles, arrows, etc. to reference one or more portions of the three-dimensional image of the item 605. In some embodiments, annotations made to the three-dimensional image of the item 605 may be included in a rejection of the item 605 or a portion of the item 605 (e.g., to help explain a reason the customer 204 is rejecting the item 605), as described below.

Referring again to FIG. 5, the online concierge system 102 may generate 540 (e.g., using the prompt generation engine 330) a prompt to be sent 545 to the client device 110b associated with the customer 204. In some embodiments, the online concierge system 102 may generate 540 the prompt for the customer 204 to accept or reject one or more portions of the item 605 based on the three-dimensional image of the item 605. For example, once the online concierge system 102 sends 535 the three-dimensional image of the item 605 to the client device 110b associated with the customer 204, the online concierge system 102 also may generate 540 the prompt for the customer 204 to accept or reject one or more portions of the item 605 based on the three-dimensional image of the item 605.

In embodiments in which the online concierge system 102 generates 540 the prompt for the customer 204 to accept or reject the item 605 or one or more portions of the item 605 based on the three-dimensional image of the item 605, the online concierge system 102 may send 545 (e.g., using the interface engine 328) the prompt to the client device 110b associated with the customer 204. For example, the prompt may be sent 545 to the client device 110b associated with the customer 204 via the CMA 206 and presented to the customer 204 via the system communication interface 404. The prompt may be sent 545 to the client device 110b associated with the customer 204 to encourage the customer 204 to accept or reject the item 605 or one or more portions of the item 605 based on the three-dimensional image of the item 605.

Figure 8A:
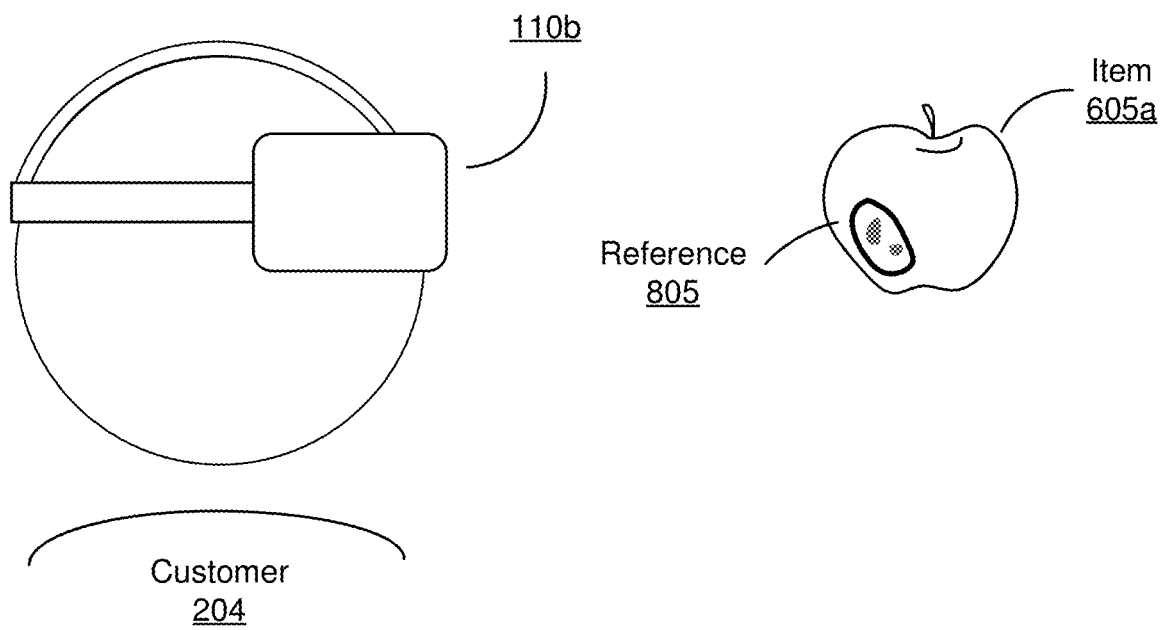
FIG. 8A illustrates a reference to a portion of a three-dimensional image of an item created using a client device associated with a customer of an online concierge system, according to one or more embodiments.
Figure 8B:
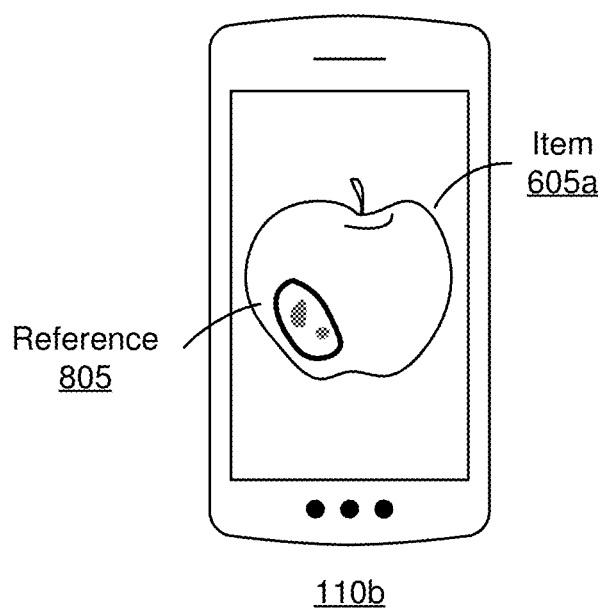
FIG. 8B illustrates a reference to a portion of a three-dimensional image of an item created using a client device associated with a customer of an online concierge system, according to one or more embodiments.

The online concierge system 102 may then receive 550 (e.g., using the interface engine 328) a response to the prompt to accept or reject the item 605 or one or more portions of the item 605 from the client device 110b associated with the customer 204. If the response corresponds to a rejection, the response also may include a reason for the rejection, one or more references to one or more corresponding portions of the three-dimensional image of the item 605, and/or a request to replace the item 605 with a different item 605 of the same type or of a different type. For example, if the online concierge system 102 receives 550 the response to the prompt, in which the response corresponds to a rejection of the item 605 and the item 605 is a Granny Smith apple, the response may indicate that the reason for the rejection is the presence of imperfections that are visible in the three-dimensional image of the apple (e.g., blemishes, bruises, holes, etc.). In this example, the response also may include references to the imperfections (e.g., circles around the imperfections, arrows pointing to the imperfections, etc.) and a request to collect a different Granny Smith apple or a different type of apple (e.g., a Gala apple, a Fuji apple, etc.). An additional example is shown in FIG. 8A, which illustrates a reference 805 to a portion of a three-dimensional image of an item 605 created using a client device 110b associated with a customer 204 of an online concierge system 102, according to one or more embodiments. In this example, a reference 805 corresponding to a circle around blemishes on the item 605a (an apple) may be made using controllers, haptic gloves, etc. of the client device 110b, in which the client device 110b is a virtual reality device. As shown in the additional example of FIG. 8B, which also illustrates a reference 805 to a portion of a three-dimensional image of an item 605 created using a client device 110b associated with a customer 204 of an online concierge system 102, according to one or more embodiments, the reference 805 may be made using a stylus, finger, keyboard, etc. on the display area of the client device 110b, in which the client device 110b is a mobile device (e.g., a smartphone or a tablet). As yet another example, if the online concierge system 102 receives 550 the response to the prompt rejecting the item 605, in which the item 605 is tomatoes on a vine, the response may indicate that the reason for the rejection is the presence of imperfections that are visible in the three-dimensional image of the tomatoes and include references 805 to the imperfections, in which tomatoes with the imperfections are crossed out. In this example, the response may include a request to remove the tomatoes that have been crossed out, such that they are not included among the collected tomatoes.

Referring again to FIG. 5, in some embodiments, the online concierge system 102 may update 555 (e.g., using the preference update engine 336) a preference/dislike of the customer 204 for the item 605 based on the response to the prompt to accept or reject the item 605 or one or more portions of the item 605 received 550 from the client device 110b associated with the customer 204. For example, suppose that the online concierge system 102 receives 550 the response from the client device 110b associated with the customer 204, in which the response corresponds to a rejection of the item 605 and includes a reason for the rejection, a reference 805 to a corresponding portion of the three-dimensional image of the item 605, and a request to replace the item 605 with a different item 605 of the same type. In this example, if the item 605 is a banana and a reason for the rejection included in the response is that the banana is too ripe and the response includes arrows referencing brown spots on the banana, the online concierge system 102 subsequently may send 535 a three-dimensional image of a replacement banana that is mostly yellow with some green that does not have any brown spots. In the above example, if the online concierge system 102 receives 550 the response from the client device 110b associated with the customer 204 accepting the replacement banana, the online concierge system 102 may update 555 a preference for bananas associated with the customer 204 stored in the online concierge system 102 (e.g., in the customer database 314) indicating the customer 204 prefers bananas that are mostly yellow with some green to bananas with brown spots. Alternatively, in the above example, if the reason for the rejection included in the response is that the customer 204 ordered one unit of bananas and wanted a bunch of bananas rather than a single banana, the online concierge system 102 may update 555 a preference for bananas associated with the customer 204 stored in the online concierge system 102 indicating that the customer 204 prefers a bunch of bananas to a single banana when ordering one unit of bananas.

In some embodiments, the online concierge system 102 may send 560 (e.g., using the interface engine 328) the response to the prompt received 550 from the client device 110b associated with the customer 204 to the client device 110a associated with the shopper 208. For example, the response to the prompt from the client device 110b associated with the customer 204 may indicate that the customer 204 accepted the item or that the customer 204 rejected the item 605 and is requesting a replacement item 605 of the same type. In this example, the online concierge system 102 may send 560 the response to the prompt to the client device 110a associated with the shopper 208, informing the shopper 208 of the response. In embodiments in which the response corresponds to a rejection of the item 605 and includes a request to replace the item 605 with a different item 605 of the same type or of a different type, one or more steps of the interaction diagram may be repeated for the replacement item 605 (e.g., by proceeding back to step 515 or 525).

Although not illustrated in FIG. 5, the online concierge system 102 also may generate (e.g., using the prompt generation engine 330) a prompt that is sent (e.g., using the interface engine 328) to the client device 110b associated with the customer 204 to include the item 605 in one or more groups (e.g., meals, recipes, etc.). For example, after receiving 550 a response to the prompt to accept the item 605, the online concierge system 102 subsequently may generate a prompt to include the item 605 in one or more groups and send the prompt to the client device 110b associated with the customer 204. A group may correspond to a recipe, a meal, a day, an event, or any other type of group that may be associated with items 605 included among the inventory of the warehouse 210. For example, if the item 605 is a loaf of sliced bread, the item 605 may be included in groups corresponding to multiple meals for a given week that would include one or more slices of the bread. Each group of items 605 may be associated with a name corresponding to a recipe (e.g., "avocado toast," "ham and cheese sandwich," etc.), a meal (e.g., "breakfast," "lunch," "dinner," "snack," etc.), a day of the week (e.g., "Sunday," "Monday," etc.), an event (e.g., picnic), etc. For example, if the item 605 is an apple, the online concierge system 102 may receive a response to the prompt from the client device 110b identifying groups corresponding to a recipe in which to include the apple (e.g., apple pie) and a meal in which to include the apple (e.g., Friday night dessert). In some embodiments, a name associated with a group may be included in an input received from the client device 110b associated with the customer 204. In embodiments in which the online concierge system 102 generates and sends a prompt to the client device 110b associated with the customer 204 to include the item 605 in one or more groups, the online concierge system 102 subsequently may receive (e.g., using the interface engine 328) a response to the prompt.

Although not illustrated in FIG. 5, in embodiments in which the online concierge system 102 receives the response to the prompt to include the item 605 in one or more groups, the online concierge system 102 may include the item 605 in the identified group(s) (e.g., using the item grouping engine 332). The online concierge system 102 also may remove the item 605 from a group or move the item 605 to a different group based on an input received from the client device 110b associated with the customer 204. In various embodiments, the online concierge system 102 is configured to store information identifying one or more items 605 included in one or more groups in the online concierge system 102 (e.g., in the item group database 334). Information identifying each group of items 605 may be stored in association with information identifying the items 605 included in the group, information identifying an order in which the item 605/group is included, information identifying a customer 204 associated with the order, a date/time that the order was placed, information identifying a warehouse 210 at which the order was fulfilled, etc. In embodiments in which a three-dimensional image of an item 605 included in a group was generated 530 by the online concierge system 102, information associated with the three-dimensional image also may be stored in association with information identifying the group. For example, information that may be used to retrieve three-dimensional images of items 605 from the online concierge system 102 (e.g., from the image database 326) may be stored in association with information identifying one or more groups in which the items 605 are included.

Figure 9:
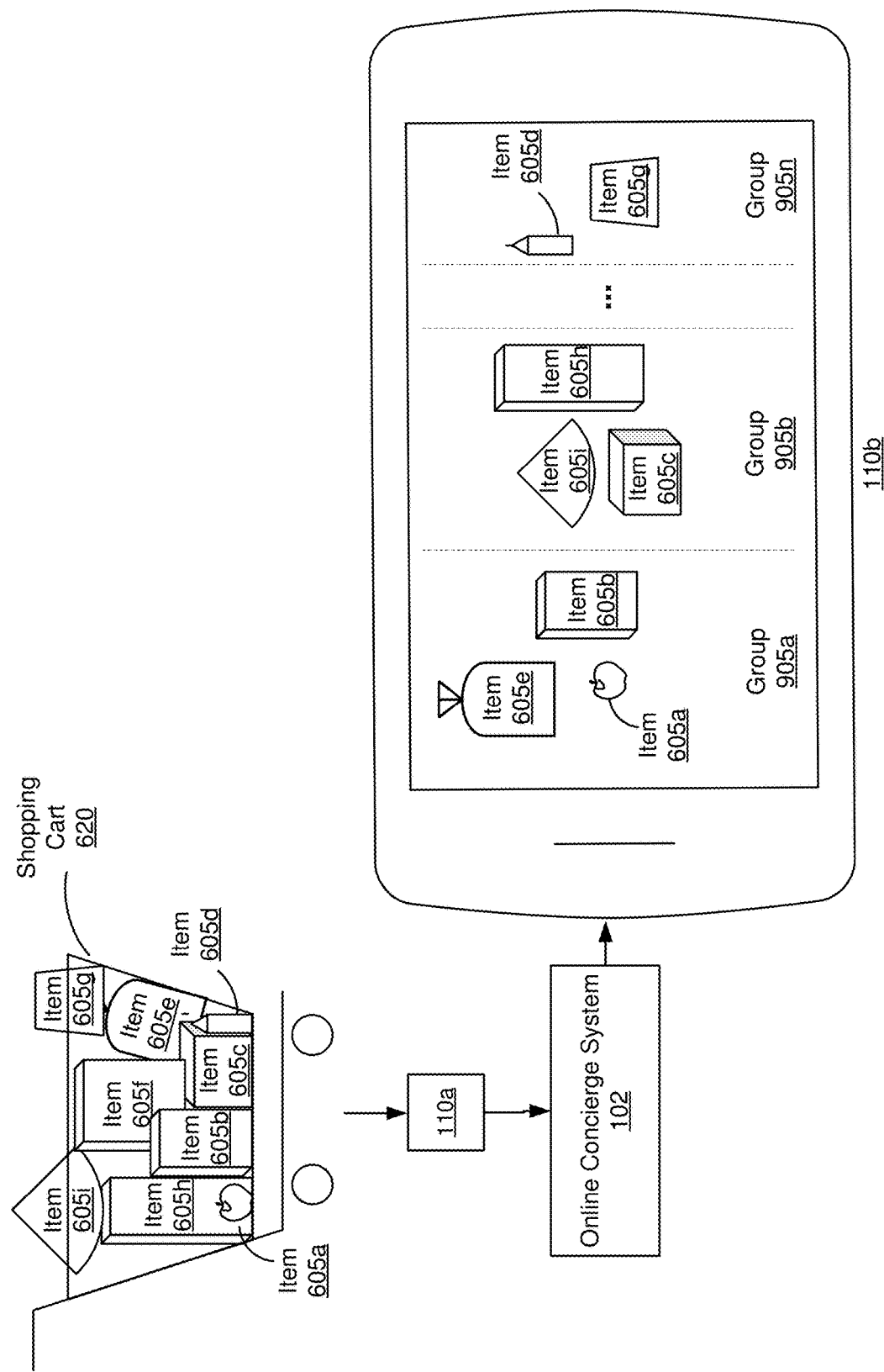
FIG. 9 illustrates multiple groupings of three-dimensional images of items within a display area of a client device, according to one or more embodiments.

In embodiments in which the online concierge system 102 includes the item 605 in one or more groups, although not illustrated in FIG. 5, the online concierge system 102 may then send (e.g. using the interface engine 328) the three-dimensional image of the item 605 in the group(s) to the client device 110b associated with the customer 204. In some embodiments, the three-dimensional image may be sent in association with one or more additional three-dimensional images of one or more additional items 605 within the group(s). For example, as shown in FIG. 9, which illustrates multiple groupings of three-dimensional images of items 605 within a display area of a client device 110b, according to one or more embodiments, items 605a-i included in an order that have been collected in a shopping cart 620 may be included in multiple groups 905a-n, in which each group 905 includes multiple items 605 used to make a different meal.

In some embodiments, if the process is repeated for a different order, customer 204, and/or shopper 208, some of the steps above may not need to be repeated. For example, if the item 605 is a pre-packaged item 605 that is of a standard shape, size, weight, etc., once the three-dimensional image of the item 605 is generated 530, it may be stored for subsequent retrieval (e.g., from the image database 326) and sent 535 to a client device 110b associated with a different customer 204. As an additional example, once images of the item 605 are captured by the shopper 208 at the warehouse 210, prompts to capture additional images of the item 605 may not be sent 520 to client devices 110a associated with other shoppers 208 collecting the item 605 at the same warehouse 210 later on that same day. In this example, the same images of the item 605 may be used to generate 530 a three-dimensional image of the item 605 sent 535 to client devices 110b of customers 204 later that day or, once generated 530, the three-dimensional image of the item 605 may be stored for subsequent retrieval (e.g., in the image database 326) and sent 535 to client devices 110b associated with customers 204 later that day.

ADDITIONAL CONSIDERATIONS

The foregoing description of the embodiments of the invention has been presented for the purpose of illustration; it is not intended to be exhaustive or to limit the invention to the precise forms disclosed. Many modifications and variations are possible in light of the above disclosure.

Some portions of this description describe the embodiments of the invention in terms of algorithms and symbolic representations of operations on information. These algorithmic descriptions and representations are commonly used in the data processing arts to convey the substance of their work effectively to others. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    receiving, by an online concierge system, an order from a client device associated with a customer of the online concierge system, the order including an item to obtain by a shopper;
    obtaining, by an attribute variability engine of the online concierge system, attributes of the item from an item database;
    identifying, by the online concierge system, whether one or more attributes of the item are variable, wherein the one or more attributes of the item comprise one or more of: a shape of the item, a dimension of the item, a quantity of the item, a quality of the item, and a color of the item;
    responsive to identifying that the one or more attributes of the item are variable, generating, by a prompt generation engine of the online concierge system, a prompt to capture a plurality of images of the item from a different angle or a different position;
    sending, by the online concierge system, the prompt to another client device associated with the shopper of the online concierge system;
    receiving, at the online concierge system, a plurality of images of an item from the client device associated with the shopper, wherein each of the plurality of images of the item is captured from one or more of a different angle and a different position and the item is included among an inventory of a warehouse associated with a retailer associated with the online concierge system;
    generating, by the online concierge system, a three-dimensional image of the item based at least in part on the plurality of images of the item, the three-dimensional image of the item comprising one or more of: a dimension of the item and a color of the item; and
    sending, by the online concierge system, the three-dimensional image of the item to the client device associated with the customer, wherein a perspective of the three-dimensional image is modifiable within a display area of the client device.

2. The method of claim 1, wherein the plurality of images of the item is included in a video of the item captured by the client device associated with the shopper.

3. The method of claim 1, wherein one or more of the plurality of images of the item are captured by one or more cameras within the warehouse associated with the retailer, wherein the one or more cameras are included in one or more of: a shopping cart system, an inventory management system, an order fulfillment system, and a checkout system.

4. The method of claim 1, wherein the three-dimensional image of the item is generated based at least in part on one or more of a reference color and a reference dimension included in one or more of the plurality of images of the item.

5. The method of claim 1, further comprising:
    sending, by the online concierge system, the prompt to the client device associated with the customer to accept or reject one or more portions of the item based at least in part on the three-dimensional image of the item sent to the client device associated with the customer;
    receiving, by the online concierge system, a response to the prompt from the client device associated with the customer; and
    sending, by the online concierge system, the response to the prompt to the client device associated with the shopper.

6. The method of claim 5, wherein the response to the prompt corresponds to a rejection of at least a portion of the item, the response to the prompt comprising one or more of: a reason for the rejection of the portion of the item, a reference to a corresponding portion of the three-dimensional image of the item, and a request to collect a different item of a same type.

7. The method of claim 1, wherein the three-dimensional image is rendered in an augmented reality environment or a virtual reality environment within a display area of the client device associated with the customer.

8. The method of claim 1, further comprising:
receiving, by the online concierge system, an input from the client device associated with the customer to include the item in a group associated with one or more additional items included among the inventory of the warehouse associated with the retailer.

9. The method of claim 8, wherein the three-dimensional image of the item is sent to the client device associated with the customer of the online concierge system in association with one or more additional three-dimensional images of the one or more additional items included among the inventory of the warehouse associated with the retailer.

10. A computer program product comprising a non-transitory computer-readable storage medium having instructions encoded thereon that, when executed by a processor of an online concierge system, cause the processor of the online concierge system to:
receive, by the online concierge system, an order from a client device associated with a customer of the online concierge system, the order including an item to obtain by a shopper;
obtain, by an attribute variability engine of the online concierge system, attributes of the item from an item database;
identify, by the online concierge system, whether one or more attributes of the item are variable, wherein the one or more attributes of the item comprise one or more of: a shape of the item, a dimension of the item, a quantity of the item, a quality of the item, and a color of the item;
responsive to identifying that the one or more attributes of the item are variable, generate, by a prompt generation engine of the online concierge system, a prompt to capture
a plurality of images of the item from a different angle or a different position;
send, by the online concierge system, the prompt to another client device associated with the shopper of the online concierge system;
receive, at the online concierge system, a plurality of images of an item from the client device associated with the shopper, wherein each of the plurality of images of the item is captured from one or more of a different angle and a different position and the item is included among an inventory of a warehouse associated with a retailer associated with the online concierge system;
generate, by the online concierge system, a three-dimensional image of the item based at least in part on the plurality of images of the item, the three-dimensional image of the item comprising one or more of: a dimension of the item and a color of the item; and
send, by the online concierge system, the three-dimensional image of the item to the client device associated with the customer, wherein a perspective of the three-dimensional image is modifiable within a display area of the client device.

11. The computer program product of claim 10, wherein the plurality of images of the item is included in a video of the item captured by the client device associated with the shopper.

12. The computer program product of claim 10, wherein one or more of the plurality of images of the item are captured by one or more cameras within the warehouse associated with the retailer, wherein the one or more cameras are included in one or more of: a shopping cart system, an inventory management system, an order fulfillment system, and a checkout system.

13. The computer program product of claim 10, wherein the three-dimensional image of the item is generated based at least in part on one or more of a reference color and a reference dimension included in one or more of the plurality of images of the item.

14. The computer program product of claim 10, wherein the computer-readable storage medium further has instructions encoded thereon that, when executed by the processor, cause the processor of the online concierge system to:
send, by the online concierge system, the prompt to the client device associated with the customer to accept or reject one or more portions of the item based at least in part on the three-dimensional image of the item sent to the client device associated with the customer;
receive, by the online concierge system, a response to the prompt from the client device associated with the customer; and
send, by the online concierge system, the response to the prompt to the client device associated with the shopper.

15. The computer program product of claim 14, wherein the response to the prompt corresponds to a rejection of at least a portion of the item, the response to the prompt comprising one or more of: a reason for the rejection of the portion of the item, a reference to a corresponding portion of the three-dimensional image of the item, and a request to collect a different item of a same type.

16. The computer program product of claim 10, wherein the three-dimensional image is rendered in an augmented reality environment or a virtual reality environment within a display area of the client device.

17. A computer system comprising:
a processor; and
a non-transitory computer readable storage medium storing instructions that, when executed by the processor, cause the processor to perform actions comprising:
receiving, by an online concierge system, an order from a client device associated with a customer of the online concierge system, the order including an item to obtain by a shopper;
obtaining, by an attribute variability engine of the online concierge system, attributes of the item from an item database;
identifying, by the online concierge system, whether one or more attributes of the item are variable, wherein the one or more attributes of the item comprise one or more of: a shape of the item, a dimension of the item, a quantity of the item, a quality of the item, and a color of the item;
responsive to identifying that the one or more attributes of the item are variable, generating, by a prompt generation engine of the online concierge system, a prompt to capture a plurality of images of the item from a different angle or a different position;
sending, by the online concierge system, the prompt to another client device associated with the shopper of the online concierge system;
receiving, at the online concierge system, a plurality of images of an item from the client device associated with the shopper associated with the online concierge system, wherein each of the plurality of images of the item is captured from one or more of a different angle and a different position and the item is included among an inventory of a warehouse associated with a retailer associated with the online concierge system;

generating, by the online concierge system, a three-dimensional image of the item based at least in part on the plurality of images of the item, the three-dimensional image of the item comprising one or more of: a dimension of the item and a color of the item; and sending, by the online concierge system, the three-dimensional image of the item to the client device associated with the customer of the online concierge system, wherein a perspective of the three-dimensional image is modifiable within a display area of the second client device.

18. The computer system of claim 17, wherein the plurality of images of the item is included in a video of the item captured by the client device associated with the shopper.

* * * * *